(12) United States Patent
Levy et al.

(10) Patent No.: US 12,001,906 B2
(45) Date of Patent: *Jun. 4, 2024

(54) TRACKING AND AUTHENTICATION OF ASSET VIA DISTRIBUTED LEDGER

(71) Applicant: DIGIPRINT IP LLC, Longboat Key, FL (US)

(72) Inventors: Avery Levy, Longboat Key, FL (US); John Cronin, Bonita Springs, FL (US)

(73) Assignee: DIGIPRINT IP LLC, Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,860

(22) Filed: Jun. 22, 2023

(65) Prior Publication Data

US 2023/0334272 A1    Oct. 19, 2023

Related U.S. Application Data

(63) Continuation of application No. 17/884,309, filed on Aug. 9, 2022, now Pat. No. 11,727,227, which is a continuation of application No. 17/171,665, filed on Feb. 9, 2021, now Pat. No. 11,409,974, which is a continuation of application No. 16/736,746, filed on Jan. 7, 2020, now Pat. No. 10,915,716, which is a continuation of application No. 16/115,339, filed on Aug. 28, 2018, now Pat. No. 10,528,776.

(51) Int. Cl.
  *G06K 7/10* (2006.01)
  *G06K 7/14* (2006.01)

(52) U.S. Cl.
  CPC ..... *G06K 7/10297* (2013.01); *G06K 7/10722* (2013.01); *G06K 7/1413* (2013.01); *G06K 7/1417* (2013.01)

(58) Field of Classification Search
  CPC ... G06K 7/10297; G06F 16/00; G06F 16/182; G06F 16/178
  USPC ................................................... 235/375, 385
  See application file for complete search history.

(56) References Cited

U.S. PATENT DOCUMENTS

| | | | |
|---|---|---|---|
| 9,610,476 B1* | 4/2017 | Tran | A63F 11/00 |
| 9,717,958 B1* | 8/2017 | Tran | G06Q 40/08 |
| 9,849,364 B2* | 12/2017 | Tran | G16H 40/63 |
| 9,975,033 B2* | 5/2018 | Tran | A63B 43/004 |
| 10,022,613 B2* | 7/2018 | Tran | G06Q 20/321 |
| 10,022,614 B1* | 7/2018 | Tran | G16H 50/20 |

(Continued)

OTHER PUBLICATIONS

U.S. Appl. No. 16/115,339 Office Action dated May 2, 2019 (17 pages).

(Continued)

*Primary Examiner* — Paultep Savusdiphol
(74) *Attorney, Agent, or Firm* — Polsinelli LLP

(57) ABSTRACT

Copies of a distributed ledger with multiple blocks are stored on multiple computing devices. A first computing device coming into proximity with a particular object triggers generation of a new block to the distributed ledger, the new block identifying a characteristic of the object and including a hash of a previous block of the distributed ledger. The new block is optionally verified before it is appended onto the distributed ledger and transmitted out to each of the multiple computing devices so that each copy of the distributed ledger includes the new block.

21 Claims, 27 Drawing Sheets

(56) References Cited

U.S. PATENT DOCUMENTS

| | | | |
|---|---|---|---|
| 10,046,228 B2* | 8/2018 | Tran | A42B 3/30 |
| 10,528,776 B1 | 1/2020 | Levy et al. | |
| 10,572,855 B1 | 2/2020 | Levy | |
| 10,915,716 B2 | 2/2021 | Levy et al. | |
| 11,409,674 B2 | 8/2022 | Bell et al. | |
| 11,636,426 B2 | 4/2023 | Levy et al. | |
| 11,727,227 B2 | 8/2023 | Levy | |
| 2005/0050165 A1 | 3/2005 | Hamynen | |
| 2017/0232300 A1* | 8/2017 | Tran | G06F 1/163 |
| | | | 434/247 |
| 2018/0078843 A1* | 3/2018 | Tran | G09B 19/0038 |
| 2018/0117446 A1* | 5/2018 | Tran | G06F 1/163 |
| 2018/0117447 A1* | 5/2018 | Tran | G09B 19/0038 |
| 2018/0133583 A1* | 5/2018 | Tran | G06F 3/00 |
| 2018/0144292 A1* | 5/2018 | Mattingly | G06F 16/903 |
| 2018/0174097 A1* | 6/2018 | Liu | G06Q 10/0833 |
| 2018/0189528 A1* | 7/2018 | Hanis | G06Q 30/0185 |
| 2018/0232693 A1* | 8/2018 | Gillen | G06Q 10/0834 |
| 2018/0264347 A1* | 9/2018 | Tran | A63B 69/38 |
| 2019/0019144 A1* | 1/2019 | Gillen | H04L 9/3247 |
| 2019/0057454 A1* | 2/2019 | Komenda | H04L 9/3242 |
| 2020/0184162 A1 | 6/2020 | Levy et al. | |
| 2020/0193367 A1 | 6/2020 | Levy | |
| 2021/0165981 A1 | 6/2021 | Levy | |
| 2022/0383006 A1 | 12/2022 | Levy | |

OTHER PUBLICATIONS

U.S. Appl. No. 16/115,339 Office Action dated Nov. 8, 2018 (20 pages).

U.S. Appl. No. 16/736,746 Office Action dated Jun. 23, 2020 (18 pages).

U.S. Appl. No. 17/171,665 Office Action dated Mar. 3, 2022 (19 pages).

U.S. Appl. No. 17/884,309 Office Action dated Dec. 23, 2022 (18 pages).

U.S. Appl. No. 16/115,371 Final Office Action dated Jun. 13, 2019 (16 pages).

U.S. Appl. No. 16/115,371 Office Action dated Dec. 13, 2018 (18 pages).

U.S. Appl. No. 16/800,924 Office Action dated Aug. 18, 2022 (30 pages).

* cited by examiner

FIG. 7B

Generating a new block to add to the blockchain can be made to be difficult if "miner" devices/nodes are to be rewarded. A predetermined difficulty target value may be used. To successfully generate a new block, a hash of the new block must be numerically less than the difficulty target value for the new block to be successful. Each "miner" device/node can try hashing different versions of the new block, each with different nonce values and thereby producing different hashes, until one of these versions of the new block has a hash that is less than the difficulty target value. 745

Difficulty target value stays constant for the duration of a predetermined time period (e.g., 2 weeks). Before the next time period starts, the difficulty target value can be adjusted using formula:

750

$$\begin{pmatrix} \text{Adj.} \\ \text{diff.} \\ \text{target} \end{pmatrix} = \begin{pmatrix} \text{Prev.} \\ \text{diff.} \\ \text{target} \end{pmatrix} \times \begin{pmatrix} \dfrac{\text{Pred. time period}}{\text{Total transaction time for N trans. during pred. time period}} \end{pmatrix}$$

| Upsell SKU | Product 1 SKU | Product 2 SKU | Product N SKU | Retail Employee ID |
|---|---|---|---|---|
| #1234567 | #9876451 | #6541237 | #7891235 | GH45 |
| #1122334 | #5546982 | #8899512 | #8449562 | TB12 |
| #4998874 | #4568213 | #6548823 | #7854218 | KI11 |
| - | - | - | - | - |
| - | - | - | - | - |
| - | - | - | - | - |

*FIG. 16*

| Keys | | Customer Data | | | NFC Data | | | Product Data | | | Transaction Data | | |
|---|---|---|---|---|---|---|---|---|---|---|---|---|---|
| Private Key | Public Key | Name | Address | E-mail | Code | Ordering Website | Retailer | SKU # | Upsell 1 SKU# | Upsell 2 SKU# | Upsell N SKU# | Account Ending | Price | NFC Used? |
| 1Z2V4H3K2 | 1234567 | Tom Smith | 123 Main Street | tsmith@gmail | SW123 | Landsend.com | Lands End | #1234567 | #9876451 | #6541237 | #7891235 | #1234 | $70.99 | No |
| 2K4G5U6W | 2345678 | John Brady | 23 Elm Street | jBrady@gmail | DF345 | Landsend.com | Lands End | #1122334 | #5546982 | #8899512 | #8449562 | #2345 | $65.78 | No |
| 4H8D97R8Y | 4567891 | Rob Mack | 6 West Street | robM@gmail | GH789 | Landsend.com | Lands End | #4998874 | #4568213 | #6548823 | #7854218 | #3456 | $57.89 | Yes |
| . | . | . | . | . | . | . | . | . | . | . | . | . | . | . |
| . | . | . | . | . | . | . | . | . | . | . | . | . | . | . |

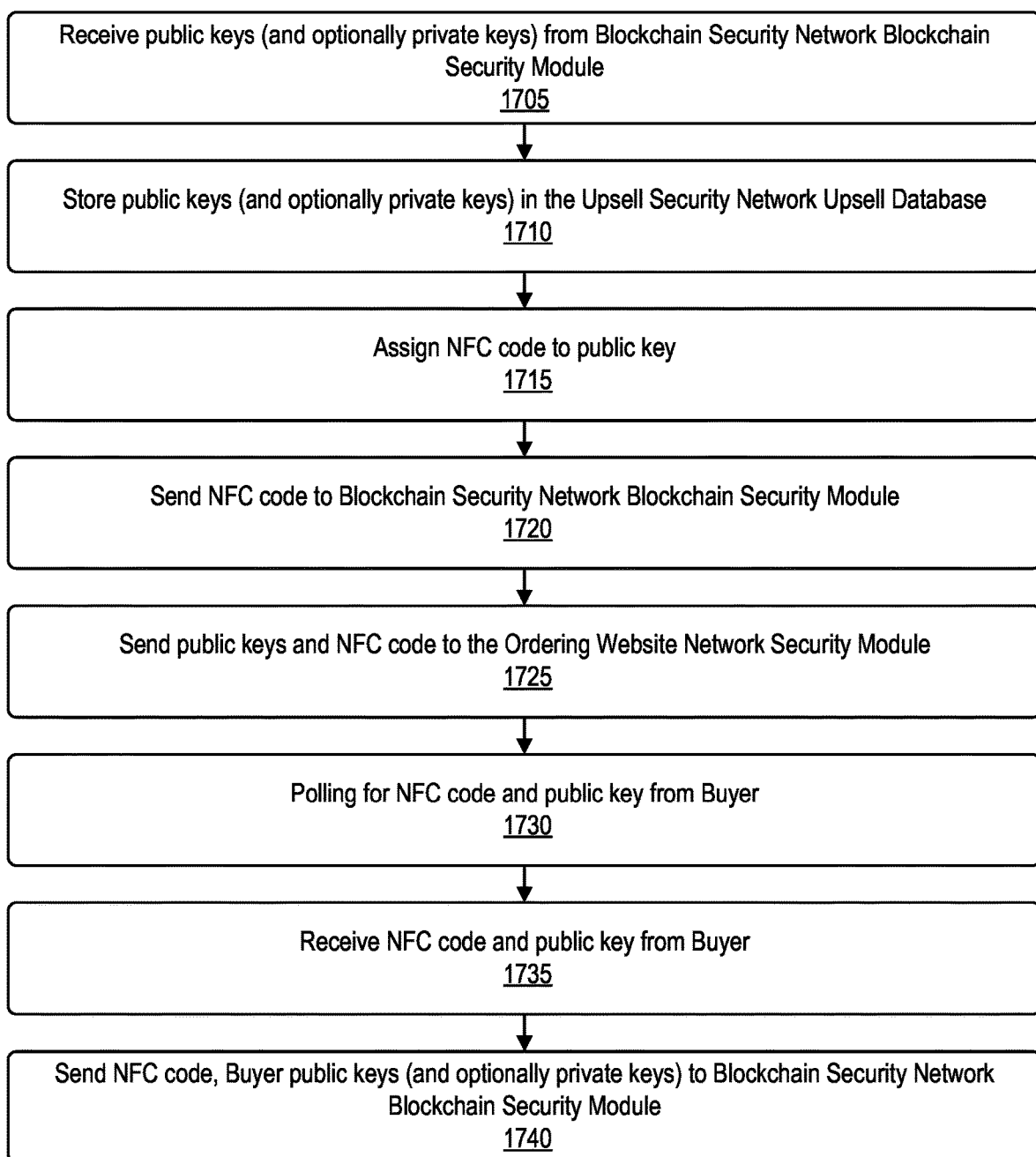

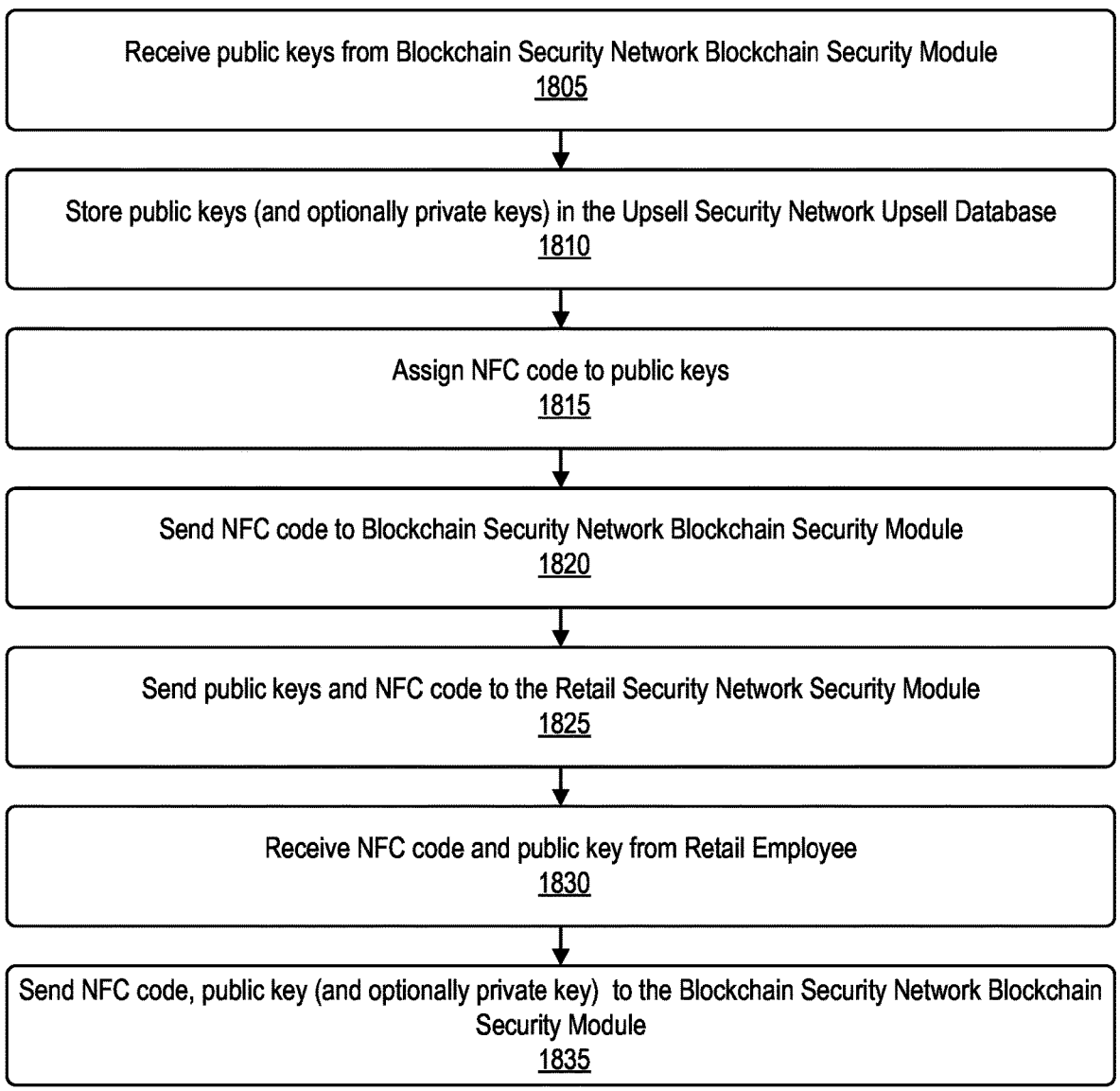

TRACKING AND AUTHENTICATION OF ASSET VIA DISTRIBUTED LEDGER

CROSS-REFERENCE TO RELATED APPLICATIONS

The present application is a continuation and claims the priority benefit of U.S. patent application Ser. No. 17/884,309 filed Aug. 9, 2022, which is a continuation and claims the priority benefit of U.S. patent application Ser. No. 17/171,665 filed Feb. 9, 2021, now U.S. Pat. No. 11,409,974, which is a continuation and claims the priority benefit of U.S. patent application Ser. No. 16/736,746 filed Jan. 7, 2020, now U.S. Pat. No. 10,915,716, which is a continuation and claims the priority benefit of Ser. No. 16/115,339 filed Aug. 28, 2018, now U.S. Pat. No. 10,528,776, the disclosures of which are incorporated herein by reference.

BACKGROUND

Field of the Invention

The present invention generally relates to transaction and product management. More specifically, the present invention relates to tracking and authentication of products and product transactions via distributed ledgers and NFC tags.

Description of the Related Art

Modern commerce provides many avenues for customers to purchase products. Products traditionally purchased by customers at brick-and-mortar stores can now be purchased over the internet from online retailers or large online commerce platforms. In some cases, customers are able purchase products directly from high-level distributors or even directly from manufacturers, which can provide cost savings for customers by cutting out "middleman" entities.

Along with these benefits to customers also come growing risks. The expansion of legitimate commerce brought about by the Internet has also increased illegitimate commerce, such as an increased risk to customers of unknowingly buying counterfeit goods. Customers purchasing from online sources often cannot see, touch, or otherwise try the actual product they will receive until it is finally delivered, potentially a long time after the purchase. A customer who receives a product that is broken, non-functional, ill-fitted, counterfeit, or simply not what the customer expected can have a difficult time returning the product, getting a refund, or getting a replacement. Customers typically also have no way to know for sure that their product is genuine.

Digital currencies (or "cryptocurrencies") such as Bitcoin are based on a distributed peer-to-peer network of devices maintaining a distributed ledgers, such as blockchain ledgers, of all transactions made using the digital currency. Distributed blockchain ledgers offer improved security between parties compared to traditional centralized systems in that blockchain ledgers are safe from outages due to their distributed nature and are nearly immutable. So far, use of blockchain ledger technologies have largely remained confined to use with digital currencies such as Bitcoin.

Near-field communication (NFC) is a short-range wireless communication technology enabling one-way or two-way wireless communications between two electronic devices. Often, one or both of these electronic devices is a portable computing device, such as a smartphone. NFC "tags" are passive data stores which can be read, and under some circumstances written to, by an NFC device. NFC tags typically do not require a battery—the wireless signals that the NFC tag receives from an "active" powered NFC device such as a smartphone generally supply enough power to the NFC tag to allow the NFC tag to emit a detectable response to the active NFC device, the response generally conveying data that is stored on the NFC tag.

Accordingly, a more secure, reliable, and distributed technology for tracking and authentication of products and product transactions is needed.

SUMMARY OF THE PRESENTLY CLAIMED INVENTION

A method of tracking of an object via a distributed architecture that includes a plurality of computing devices is described. The method includes storing a blockchain ledger comprising a plurality of blocks, wherein each of the plurality of computing devices also stores a copy of the blockchain ledger. The method also includes receiving, from a first computing device, an indication of proximity between the first computing device and the object, wherein the indication of proximity also identifies the object. The method also includes generating a hash of a most recent block of the blockchain ledger and generating a new block header for a new block, wherein the new block header comprises at least the hash of the most recent block of the blockchain ledger. The method also includes generating the new block, wherein the new block comprises at least the new block header and one or more transactions corresponding to one or more changes to a characteristic of the object. The method also includes appending the new block to the plurality of blocks of the blockchain ledger and transmitting the new block to the plurality of computing devices that each store the blockchain ledger, causing each of the plurality of computing devices to also append the new block to their respective copy of the blockchain ledger, thereby recording the one or more transactions in the blockchain ledger.

A system for tracking of an object via a distributed architecture that includes a plurality of computing devices is described. The system includes a non-transitory computer-readable storage medium that stores a blockchain ledger including a plurality of blocks, wherein each of the plurality of computing devices also stores a copy of the blockchain ledger. The system also includes a network communication transceiver that receives an indication of proximity between a first computing device and the object and that transmits a new block to the plurality of computing devices, wherein the indication of proximity between the first computing device and the object identifies the object. The system also includes one or more processors executing instructions that are stored in a memory, wherein execution of the instructions via the one or more processors causes the one or more processors to perform system operations. The system operations include generating a hash of a most recent block of the blockchain ledger and generating a new block header for the new block, wherein the new block header comprises at least the hash of the most recent block of the blockchain ledger. The system operations also include generating the new block, wherein the new block comprises at least the new block header and one or more transactions corresponding to one or more changes to a characteristic of the object. The system operations also include appending the new block to the plurality of blocks of the blockchain ledger.

A method of tracking of an object via a distributed architecture that includes a plurality of computing devices is described. The method includes storing a blockchain ledger comprising a plurality of blocks, wherein each of the plurality of computing devices also stores a copy of the blockchain ledger. The method also includes receiving, at a first computing device, an indication of proximity between the first computing device and the object, wherein the indication of proximity between the first computing device and the object also identifies the object. The method also includes transmitting a request to add a new block to the blockchain ledger to at least one of the plurality of computing devices, the new block including one or more transactions corresponding to one or more changes to a characteristic of the object. The method also includes receiving the new block and appending the new block to the plurality of blocks of the blockchain ledger.

BRIEF DESCRIPTION OF THE DRAWINGS

FIG. 7B is a flow diagram illustrating operations through which generation of a new blocks for the distributed ledger is optionally incentivized.

FIG. 13 illustrates an online retailer product database tracking related product groups ("upsell" products) as sold by particular retail employees.

FIG. 16 illustrates a transaction tracking database optionally for use with or instead of the distributed ledger.

FIG. 17 is a flow diagram illustrating data transfer with respect to keys and NFC data in a purchase made through an online retailer.

FIG. 18 is a flow diagram illustrating data transfer with respect to keys and NFC data in a purchase made through a brick-and-mortar retailer.

DETAILED DESCRIPTION

Copies of a distributed ledger with multiple blocks are stored on multiple computing devices. A first computing device coming into proximity with a particular object triggers generation of a new block to the distributed ledger, the new block identifying a characteristic of the object and including a hash of a previous block of the distributed ledger. The new block is optionally verified before it is appended onto the distributed ledger and transmitted out to each of the multiple computing devices so that each copy of the distributed ledger includes the new block. Proximity is optionally determined based on successful conveyance of short-range wireless communications between the first computing device and a Near Field Communication (NFC) tag coupled to the object.

Figure 1A:
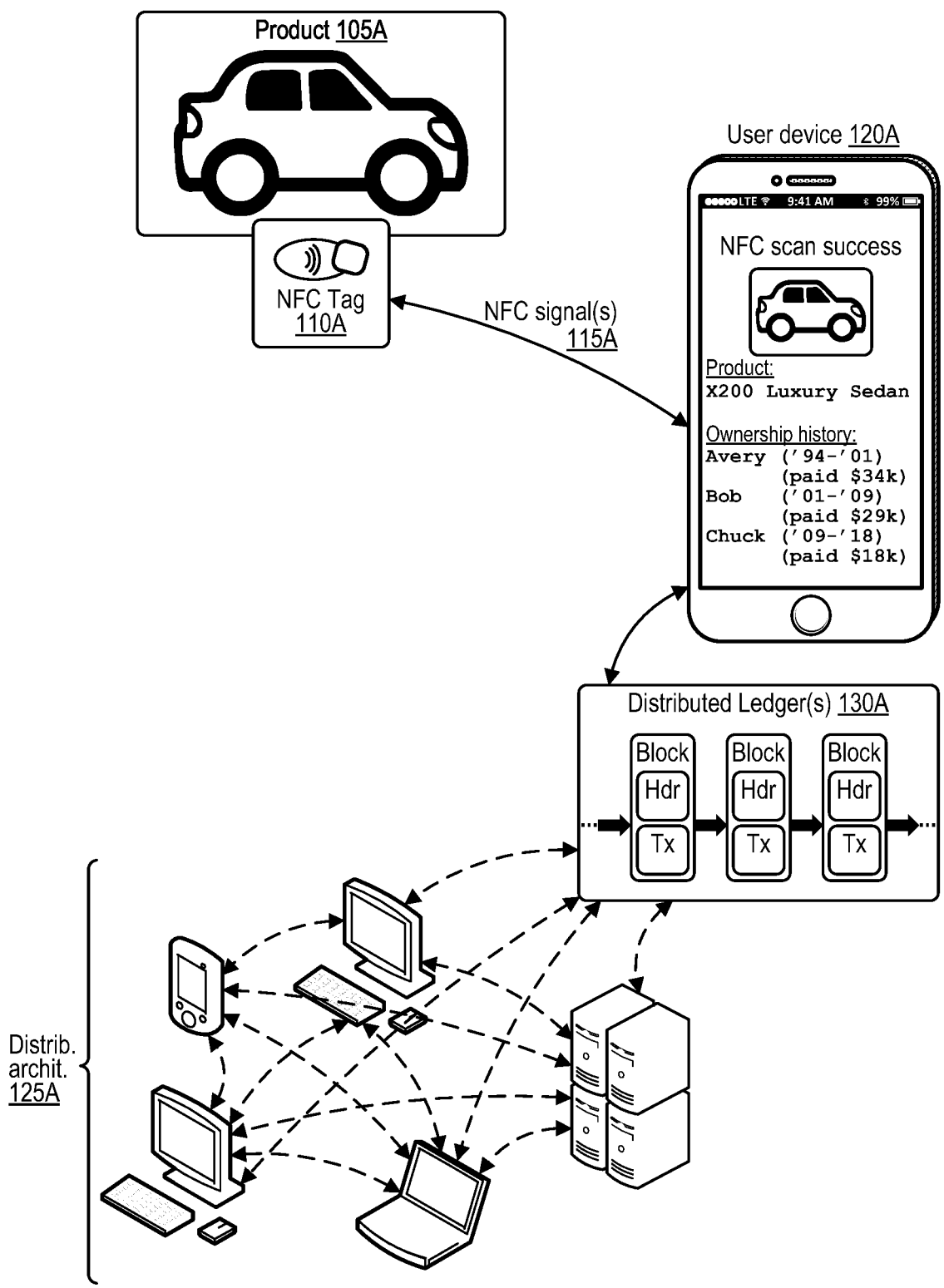
FIG. 1A illustrates retrieval of an ownership history of a product as accessed from a distributed ledger using an NFC tag associated with the product.

FIG. 1A illustrates retrieval of an ownership history of a product as accessed from a distributed ledger using an NFC tag associated with the product.

In particular, a product 105A—which in FIG. 1A appears as an automobile vehicle 110A—includes an NFC tag 110A. The NFC tag 110A may be, for example, embedded in a portion of the vehicle 105A, such as along the dashboard, or on an exterior or interior surface of a door.

The user device 120A, which in most cases is a computing device 800, communicates with the NFC tag 110A via one or more short-range wireless signals 115A. The user device 120A may provide electrical power wirelessly to the NFC tag 110A, in response to which the NFC tag 110A conveys data/information to the user device 120A via NFC signals 115A. For example, the NFC tag 110A can provide the user device 120A with a code that the user device 120A would otherwise not know. The code may be a unique identifier corresponding to that particular NFC tag 110A. The NFC tag 110A can alternately or additionally provide the user device 120A with an address or other information identifying or pointing to a particular distributed ledger 130A in a way that makes the particular distributed ledger 130A accessible.

While the code may store information about characteristics of the object, memory of NFC tags may sometimes be hardcoded and immutable or difficult to change. Thus, information that may change over time, such as ownership of the vehicle 105A, is better stored externally from the NFC tag 110A, such as via the distributed ledger 130A. The user device 120A can use the address or identifier identifying the distributed ledger 130A provided by the NFC tag 110A to access the distributed ledger 130A, copies of which are stored at each device of a distributed architecture 125A having multiple computing devices 800. As illustrated in FIG. 1A, the information identifying the product 105A as a "X200 Luxury Sedan" is conveyed to the user device 120A either encoded directly in the wireless signals 115A, in the distributed ledger 130A, or both. The distributed ledger 130A stores information keeping track of the ownership history of the vehicle 105A. The ownership history illustrated in FIG. 1A identifies that the vehicle 105A was owned by Avery (who paid $3400 for the vehicle 105A) from 1994 to 2001, was owned by Bob (who paid $2900 for the vehicle 105A) from 2001 to 2009, and was owned by Chuck (who paid $1800 for the vehicle 105A) from 2009 to 2018. The user device 110A reads and parses this ownership history from the distributed ledger(s) 130A, then displays this ownership history.

The code may also include one or more resources pointing to one or more websites and/or databases associated with one or more providers such as one or more of a retailer (online or brick-and-mortar), a manufacturer, a distributor, a shipping provider, any other type of provider discussed herein, or some combination thereof. In some cases, information in the code may be encrypted using a public key or a private key of a keypair that includes a public key and a private key, where the other key of the keypair is in the possession of at least one of the one or more providers discussed above. The code conveyed by the NFC tag 110 may in some cases include such a public key or private key. These processes are discussed further with respect to FIGS. 9-18.

The distributed ledger may be a public distributed ledger or a private distributed ledger, sometimes referred to as a "permissioned" distributed ledger. Public distributed ledgers provide the benefit of unbiased verification by anyone with access to the ledger (and in general by a greater population), but have the risk of making public data that should remain secret or otherwise not be public. Private or privileged distributed ledgers reduce the risk of making public data that should remain secret or otherwise not be public, as they are only accessible to computers through one or more "gateway" servers (which are computing devices 800) controlling access to the distributed ledger by requiring that computing devices 800 requesting access to the distributed ledger be authenticated (e.g. via a signature encrypted with a user's private key that is verified by a certificate authority with the corresponding public key) as having permission to access it. Private or privileged distributed ledgers can thus limit access to certain data (e.g., from competitors or malicious parties), but reduce the pool of verifying machines and thereby increase the risk of bias in blockchain verification procedures, and also introduce "trusted" middleman parties or servers such as the certificate authority that reduce the degree of decentralization introduce potential points of failure. To get the best of both worlds, there may effectively be a public "portion" and a private "portion" of a distributed ledger, which may actually in execution be a separate public distributed ledger and a separate private/permissioned distributed ledger. In a private or privileged distributed ledger, authentication by the gateway server and via the signature/certificate authority may be required to acquire permission to read or access one or more blocks of the distributed ledger, to acquire permission to request a transaction be added to the ledger, to acquire permission to request a new block be added to the ledger, to acquire permission to verify a transaction or a new block, to acquire permission to finalize the appending of a new block (and transmit the new block and/or updated ledger to the distributed architecture 125), or some combination thereof. Whether a distributed ledger as used herein is public or private, storage of data in the distributed ledger provides protection from outages or data corruption in that data associated with a particular provider is stored on additional devices, and diversifies how important data within the provider's organization is stored.

Figure 1B:
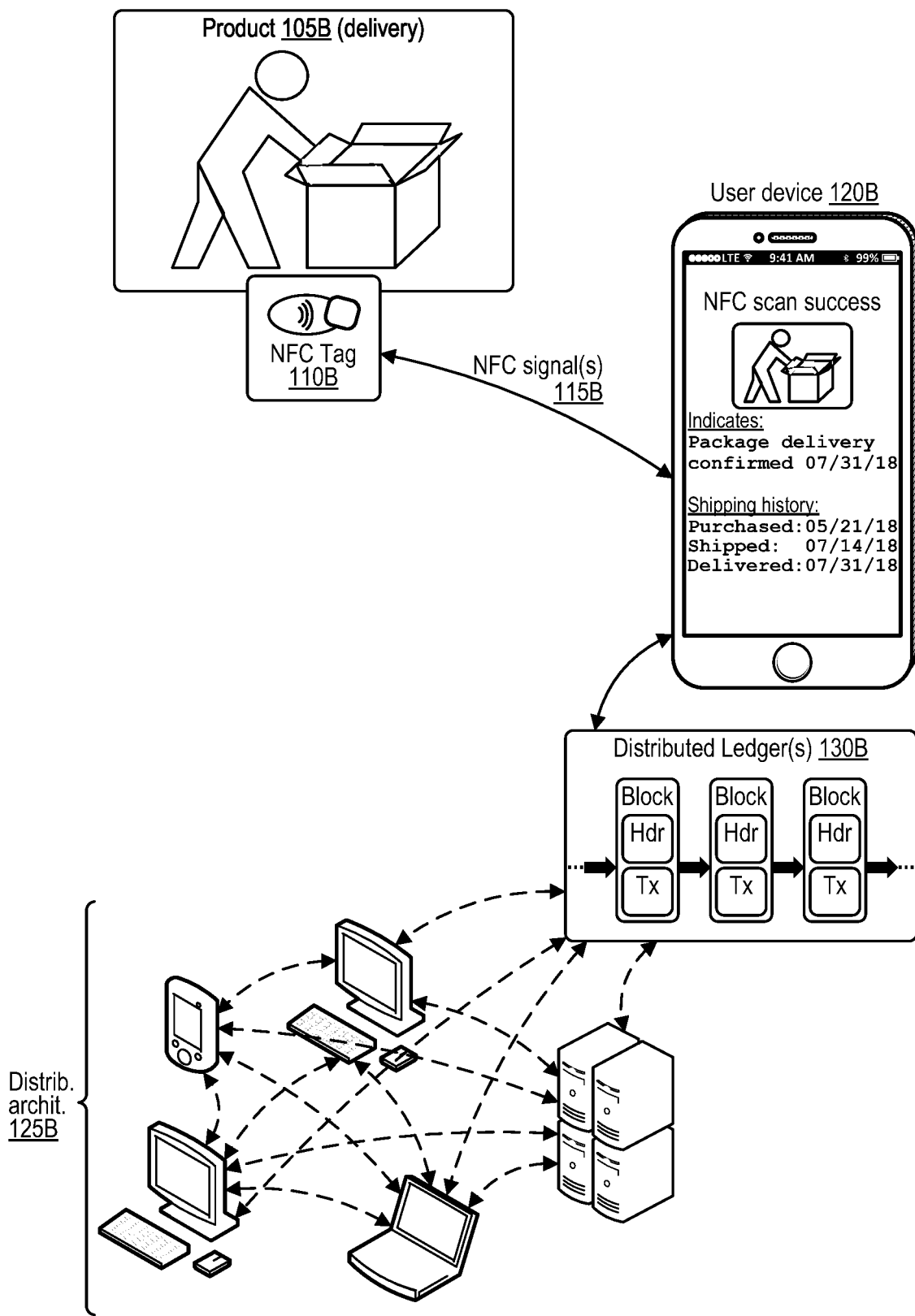
FIG. 1B illustrates retrieval of a shipping history of a product as accessed from a distributed ledger using an NFC tag associated with the product.
Figure 1C:
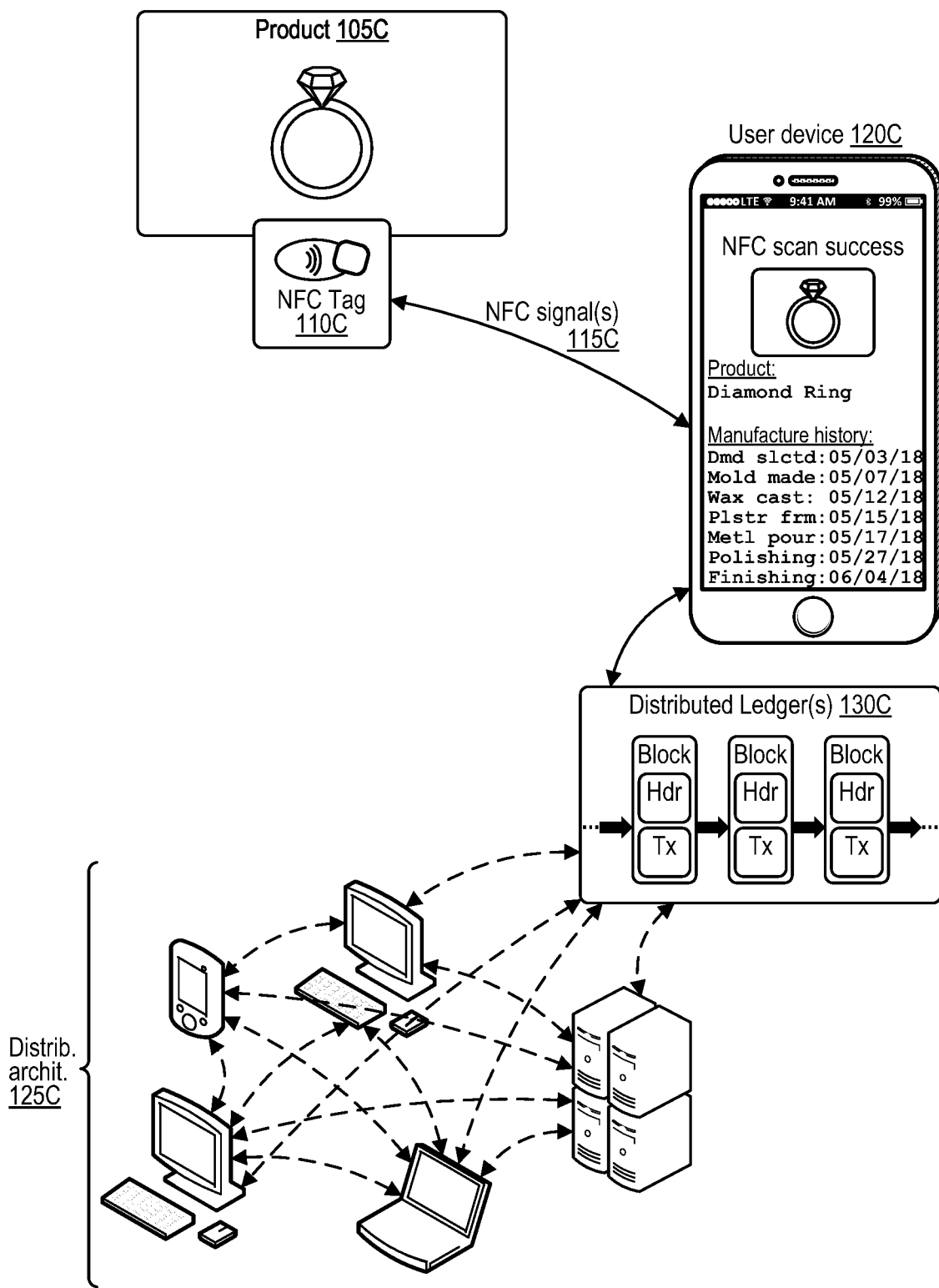
FIG. 1C illustrates retrieval of a manufacturing history of a product as accessed from a distributed ledger using an NFC tag associated with the product.
Figure 1D:
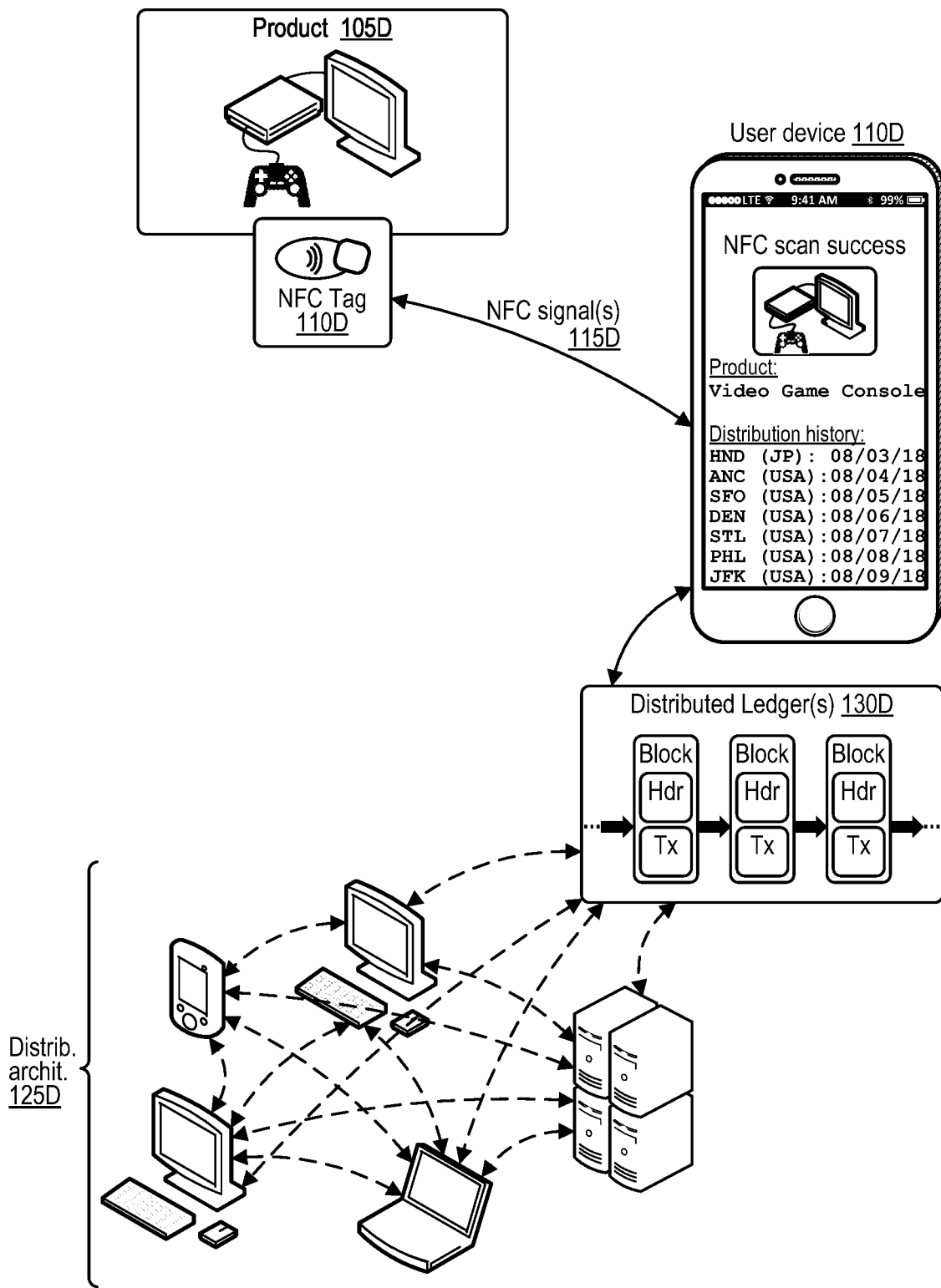
FIG. 1D illustrates retrieval of a distribution history of a product as accessed from a distributed ledger using an NFC tag associated with the product.
Figure 1E:
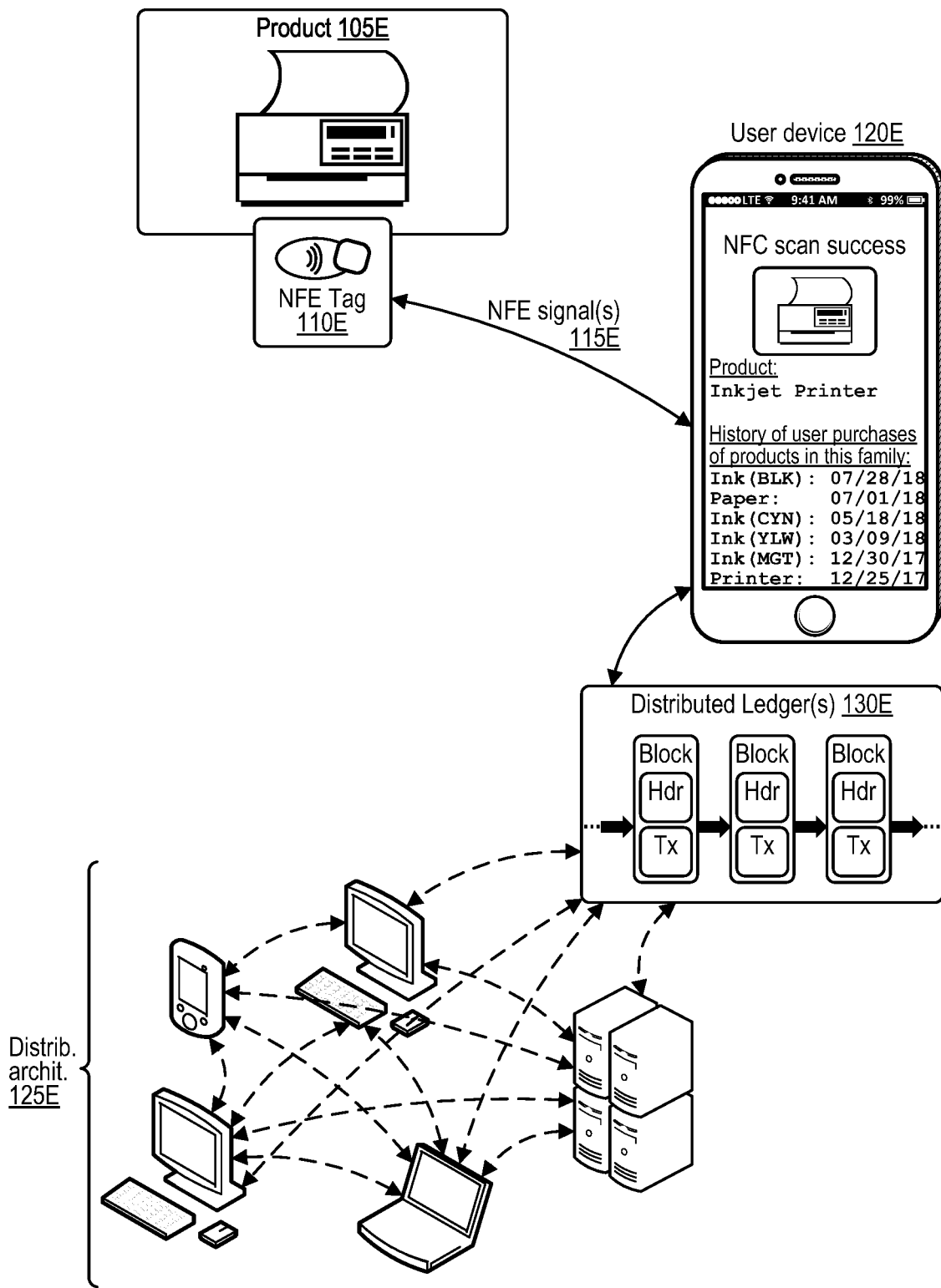
FIG. 1E illustrates retrieval of a user's purchase history of products related to a particular product accessed from a distributed ledger using an NFC tag associated with the particular product.

As an example, one or more providers discussed above may wish to keep certain data a trade secret, such as information about which products are related to each other (in other words, are "upsell" products with relation to each other) as in FIG. 1E, or a manufacturing schedule as in FIG. 1C, or a distribution pipeline as in FIG. 1D. Similar data may also be kept private to address consumer privacy concerns, such as the ownership data of FIG. 1A or location data of FIG. 1G (if it were to track location of the object even after it is purchased by the consumer) or shipping history of FIG. 1B (particularly if consumer addresses are stored). Such data would best be placed in a private/permissioned distributed ledger accessible only to computing devices 800 associated with one or more of the providers discussed above. Less sensitive data, such as usage history of a baseball as in FIG. 1F, or location history only in aisles of a store/warehouse as in FIG. 1G, may be in a public distributed ledger. It should be understood that the examples provided herein are not to be construed as limiting, and that any of the data described herein as potentially being stored in a distributed ledger 130 may be stored in a public distributed ledger or a private/permissioned distributed ledger.

The user device 120A may add a new block corresponding to a new ownership record to the distributed ledger 130A, for example when Chuck sells the vehicle 105A to a new user, Dave. The user device 120A may have a public/private key pair, including a private key and a public key, that corresponds to that user device 120A in particular and/or to a particular user or individual that uses the user device 120A (in this example, this could be either transferor "Chuck" or transferee "Dave"). The user device 120A may encrypt the code received from the NFC tag 110A via the wireless signals 115A using the private key.

The user device 120A can then send this encrypted code to the computing devices 800 of the distributed architecture 125A, which may then verify, using the public key, that the code was encrypted using the corresponding private key, and that this public/private keypair corresponds to an user and/or device that is appropriate to be requesting a transaction between the transferor and the transferee—for instance, by verifying that the public/private keypair corresponds to the transferor or to the transferee. Since the private key is inaccessible to anyone other than these users, nobody can pretend to be them. Each user's public key, on the other hand, is made available to each of the computing devices 800 of the distributed architecture 125A for this verification process, for example via one or more centralized certificate authority (CA) server(s) or a distributed certificate authority (CA) ledger stored on another distributed ledger 130. Verification can also entail checking to make sure that the object 105A that the transferor ("Chuck") is attempting to transfer to the transferee ("Dave") is actually possessed by the transferor at the moment the transaction was attempted, and that no concurrent conflicting transaction was also pending, such as transferor "Chuck" simultaneously attempting to transfer the vehicle 105A to another transferee "Edward."

Figure 4A:
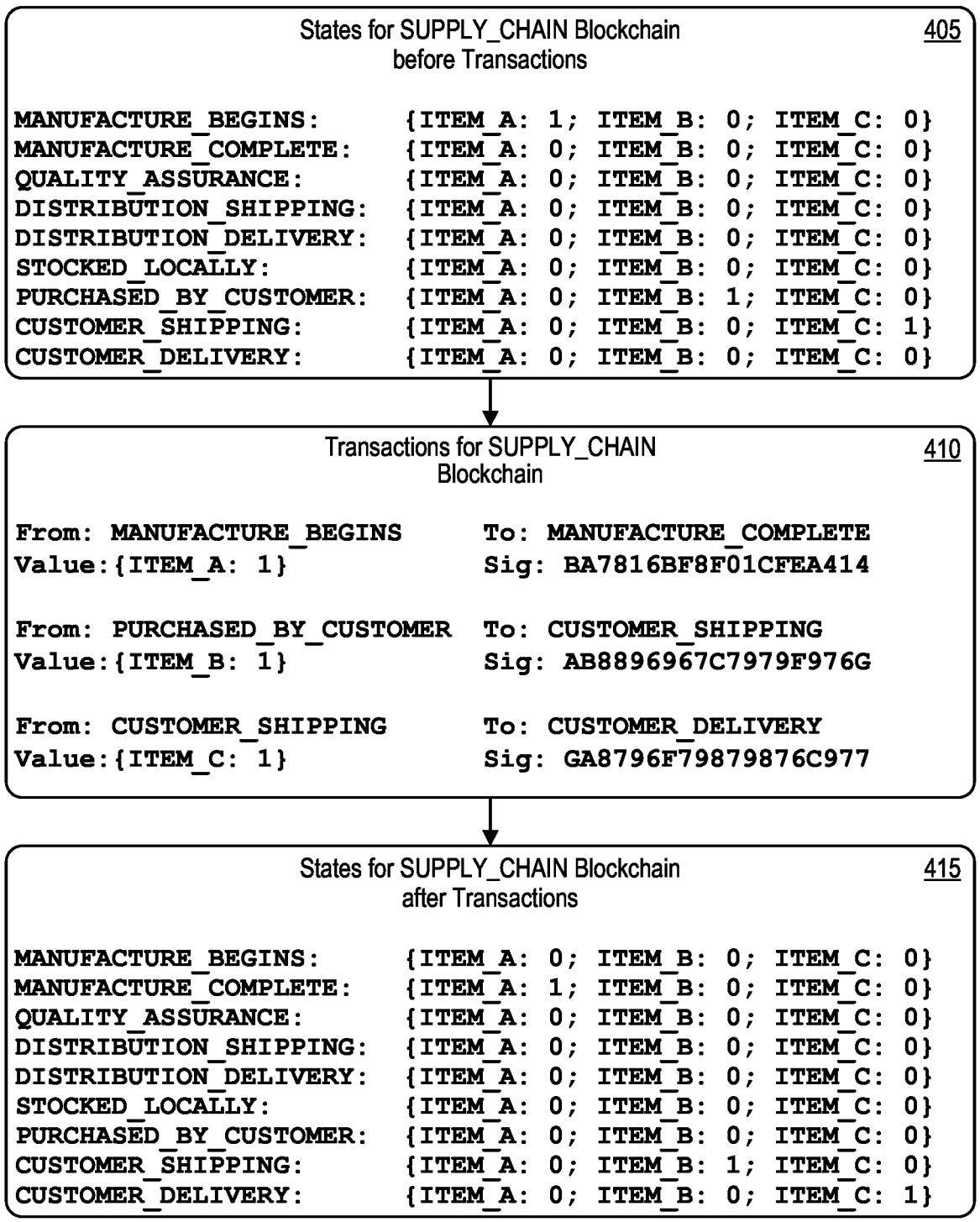
FIG. 4A illustrates transactions related to supply chain stages of three items as recorded via distributed ledger.

It should be understood that each of the transactions of the distributed ledger 130A were added in this way. That is, a user device 120 corresponding to Avery or Bob inserted the transaction from Avery to Bob into the distributed ledger 130A, and a user device 120 corresponding to Bob or Chuck inserted the transaction from Bob to Chuck into the distributed ledger 130A. Such transactions are illustrated in FIG. 4A.

In the case where the product 105 is a vehicle 105A as in FIG. 1A, or where the product 105 is another structure with doors like a building (not pictured), the NFC tag 110A may be reachable from the exterior of the product 105 and may be electrically connected to circuitry of the product 105 in a way that makes it necessary to interact with the NFC tag 110A for a new user to open doors the product 105, and can even in some cases make it necessary for a user device 120A to provide confirmation to the NFC tag 110A (especially when the NFC tag 110A is an active NFC device) that it is the user device 120A of the current owner of the product 105 as identified in the distributed ledger 130A. This can be done by the user device 120A encrypting data, such as the code from the NFC tag 110A, using its private key, and sending the encrypted data to the NFC tag 110A to decrypt using the public key to confirm identity.

Figure 3:
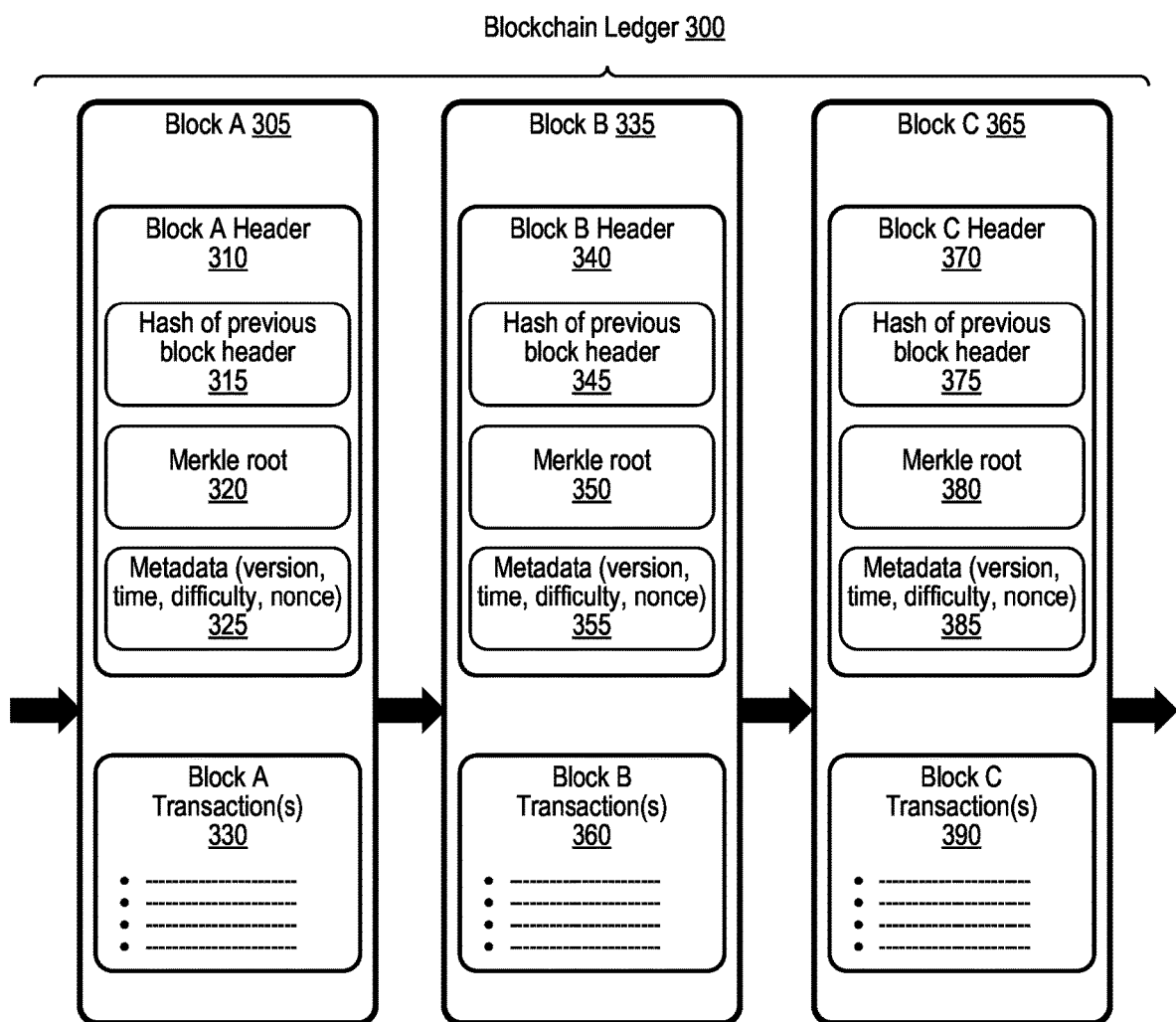
FIG. 3 illustrates a portion of a blockchain ledger that implements distributed product transaction tracking and authentication.

The distributed ledger(s) 130 illustrated in FIGS. 1A-1G are illustrated as blockchain ledgers with multiple blocks that each have a header and list one or more transactions as discussed further in FIG. 3.

The user device 120 discussed in FIG. 1A-1G is illustrated as a computing device 800 that is that is mobile, portable, battery-powered, handheld, or a combination thereof. The user device 120 need not be a computing device 800, but can still include one or more of the components of the computing device 800 discussed with respect to FIG. 8.

The NFC tags 110 discussed in FIG. 1A-1G may be passive NFC tags that rely on receiving power wirelessly from short-range wireless signals sent by the user device 120 or may alternately be active NFC devices that are powered by one or more electrically connected power sources such as batteries. Such active NFC devices may be computing devices 800 or may include one or more of the components of the computing device 800 discussed with respect to FIG. 8.

While elements 110 and 115 of FIG. 1A-1G are referred to as an "NFC tag" and "NFC signal(s)," these elements can alternately or additionally use a variety of other short-range wireless transceivers and short-range wireless signals, respectively. This can include any combination of wireless transceiver(s), signal(s), and/or protocol(s) discussed with respect to the input devices 860 and/or output devices 850 of FIG. 8. The short-range wireless signals 115 can in some cases represent unidirectional communication/transmissions—i.e., the short-range wireless transceiver 110 sending information and/or power via short-range wireless signal(s) 115 to the user device 120, or the user device 120 sending information and/or power via short-range wireless signal(s) 115 to the short-range wireless transceiver 110. The short-range wireless signals 115 can alternately be bidirectional communication/transmissions—i.e., the short-range wireless transceiver 110 sending information and/or power via short-range wireless signal(s) 115 to the user device 120, and the user device 120 sending information and/or power via short-range wireless signal(s) 115 to the short-range wireless transceiver 110. The "NFC tag 110" may also be replaced or supplemented with an optical glyph, such as a barcode or a quick response (QR) code, which may be scanned optically via one or more camera(s) of the user device 120. This optical glyph may encode any of the information discussed with respect to the NFC tag 110.

FIG. 1B illustrates retrieval of a shipping history of a product as accessed from a distributed ledger using an NFC tag associated with the product.

The product 105B illustrated in FIG. 1B is an object shipped and delivered to a user, for example in a package that at least partially covers the product 105 or object itself. For example, the product 105B may be a product ordered by a user from an online retailer and shipped to the user.

The NFC tag 110B of FIG. 1B may be coupled to the package covering the product 105B or to the product 105B itself that is at least partially within or inside the package. Like the doors of the vehicle product 105A of FIG. 1A, the package of the product 105B may require interaction with the NFC tag 110B and/or verification of the product 105B having been delivered according to the distributed ledger 130B and/or verification of identity of the user device 120B and/or its associated user via public/private keypair in order to open the package to remove and/or use the product 105B that is at least partially within the package.

The user device 110B of FIG. 1B displays an identification of the product 105B of FIG. 1B as a "package delivery" which may be conveyed to the user device 110B via NFC signals 115B from the NFC tag 110B, via the distributed ledger(s) 130B of FIG. 1B, or both. The distributed ledger(s) 130B of FIG. 1B stores, and the user device 110B of FIG. 1B reads, parses, and displays, that the package delivery was purchased on May 21, 2018, that the package delivery was shipped on Jul. 14, 2017, and that the package delivery was confirmed delivered on Jul. 31, 2018.

To provide these shipping milestones, different user devices 120B add transactions to the distributed ledger(s) 130B, transitioning an item corresponding to the product 105B from a state "PURCHASED" to a state "SHIPPED," and from a state "SHIPPED" to a state "DELIVERED," in a manner similar to that of FIG. 4A. These different user devices 120B are user devices 120B that have scanned the NFC tag 110B and are verified as appropriate devices based on public-private keypair encryption of the NFC code from the NFC signal(s) 115B as discussed above. For example, a user device 120B associated with the online retailer from which the product 105B was purchased can add the "purchased" indication into the distributed ledger 130, a user device 120B associated with shipping of the package containing the product 105B can add the "shipped" indication into the distributed ledger 130, and a user device 120B associated with either delivery personnel or a customer/recipient of the packages can add the "delivered" indication into the distributed ledger 130.

FIG. 1C illustrates retrieval of a manufacturing history of a product as accessed from a distributed ledger using an NFC tag associated with the product.

The product 105C illustrated in FIG. 1C is a diamond ring, manufacture of which requires a number of steps. As with FIG. 1A and FIG. 1B, above, the NFC tag 110C may be coupled to the ring 105C itself or to packaging, such as a ring box. The identity of the product 105C as a diamond ring may be stored in the NFC tag 110C and conveyed to the user device 120C via the wireless signals 115C, or may be stored in the distributed ledger(s) 130C and read by the user device 120C upon its retrieval, storage, and parsing of a copy of the distributed ledger(s) 130C.

The distributed ledger(s) 130C of FIG. 1C store(s), and the user device 110C of FIG. 1C reads, parses, and displays, that the diamond for the diamond ring product 105C was selected on May 3, 2018; that a mold was made for the diamond ring product 105C on May 7, 2018; that a wax cast was made for the diamond ring product 105C on May 12, 2018; that a plaster form was made for the diamond ring product 105C on May 15, 2018; that metal was poured into the plaster form for the diamond ring product 105C on May 17, 2018; that the diamond ring product 105C was polished on May 27, 2018; and that the diamond ring product 105C was finished on Jun. 4, 2018. Different user devices 120C of the distributed architecture 125C may add transactions corresponding to these different manufacturing milestones to the distributed ledger(s) 130C as illustrated in FIG. 4A. Each of these devices may be computing devices 800 that are associated with one or more of the stages of manufacturing (e.g., diamond selection, molding, wax casting, plaster forms, metal pouring, polishing, finishing) in a manner that is verifiable via public-private keypair as discussed above.

FIG. 1D illustrates retrieval of a distribution history of a product as accessed from a distributed ledger using an NFC tag associated with the product.

The product 105D illustrated in FIG. 1D is a video game console, distribution of which has a number of stops. As with FIG. 1A-1C above, the NFC tag 110D may be coupled to the video game console 105D itself or to packaging, such as a box, that at least partially contains the video game console 105D. The identity of the product 105D as a video game console may be stored in the NFC tag 110D and conveyed to the user device 120D via the wireless signals 115D, or may be stored in the distributed ledger(s) 130D and read by the user device 120D upon its retrieval, storage, and parsing of a copy of the distributed ledger(s) 130D.

The distributed ledger(s) 130D of FIG. 1D store(s), and the user device 110D of FIG. 1D reads, parses, and displays, that the video game console 105D was at or near the Tokyo International Airport (HND) in Japan on Aug. 3, 2018; that the video game console 105D was at or near the Ted Stevens Anchorage International Airport (ANC) in the United States on Aug. 4, 2018; that the video game console 105D was at or near the San Francisco International Airport (SFO) in the United States on Aug. 5, 2018; that the video game console 105D was at or near the Denver International Airport (DEN) in the United States on Aug. 6, 2018; that the video game console 105D was at or near the Lambert St. Louis International Airport (STL) in the United States on Aug. 7, 2018; that the video game console 105D was at or near the Philadelphia International Airport (PHL) in the United States on Aug. 8, 2018; and that the video game console 105D was at or near the John F. Kennedy International Airport (JFK) in New York in the United States on Aug. 9, 2018. While the codes illustrated in FIG. 1D traditionally represent airports, these can also be understood to represent nearby distribution warehouses, retail stores, waterway ports, truck depots, train depots, and other stops corresponding to various avenues and types of distribution.

Different user devices 120D of the distributed architecture 125D may add transactions corresponding to these different distribution milestones to the distributed ledger(s) 130D in the manner illustrated in FIG. 4A. Each of these devices may be computing devices 800 that are associated with one or more of the locations/stops along the distribution route (e.g., HND, ANC, SFO, DEN, STL, PHL, JFK) in a manner that is verifiable via public-private keypair as discussed above.

FIG. 1E illustrates retrieval of a user's purchase history of products related to a particular product accessed from a distributed ledger using an NFC tag associated with the particular product.

The product 105E illustrated in FIG. 1E is an inkjet printer, which has a number of related products such as paper and ink in colors such as black, yellow, cyan, magenta. As with FIG. 1A-1D above, the NFC tag 110E may be coupled to the printer 105E itself or to packaging, such as a box, that at least partially contains the printer 105E. The identity of the product 105E as a printer may be stored in the NFC tag 110E and conveyed to the user device 120E via the wireless signals 115E, or may be stored in the distributed ledger(s) 130E and read by the user device 120E upon its retrieval, storage, and parsing of a copy of the distributed ledger(s) 130E.

The distributed ledger(s) 130E of FIG. 1E store(s), and the user device 110E of FIG. 1E reads, parses, and displays, that the printer 105E itself was purchased on Dec. 25, 2017; that related product magenta ink was purchased on Dec. 30, 2017; that related product yellow ink was purchased on Mar. 9, 2018; that related product cyan ink was purchased on May 18, 2018; that related product paper was purchased on Jul. 1, 2018; and that related product black ink was purchased on Jul. 28, 2018. Different user devices 120E of the distributed architecture 125E may add transactions corresponding to these different distribution milestones to the distributed ledger(s) 130E in the manner illustrated in FIG. 4B. Each of these devices may be computing devices 800 that are associated with purchase of the printer 105E itself or one of the related products, such as a user device 110E of the customer buying the printer 105E itself or one of the related products, or a user device 110E of a retail employee or online retailer server selling the printer 105E itself or one of the related products, in a manner that is verifiable via public-private keypair as discussed above.

In some cases, the distributed ledger(s) 130E of FIG. 1E store(s) data identifying one or more retail employees that were able to sell one or more related products in a particular sales transaction and/or one or more consumers who purchased one or more related products in a particular purchase transaction. Such sales and purchase transactions may also be monitored to automatically identify new related products. For instance, using the printer example of FIG. 1E, a new type of photo paper may come in stock, and may be identified as an "upsell" product related to the inkjet printer due to a number of purchases by the same customer, either in the same sales/purchase transaction or over time—and/or by the same retail employee, for example if the retail employee specializes in printers and related products. In another example, if the product 105E were a shoe, then related products could include shoelaces, shoehorns, shoe polish, leather conditioner, leather care oil, suede waterproofing fluid, shoe trees, shoe polish, shoe shine, shoe brushes, shoe shine cloth, and the like.

Figure 1F:
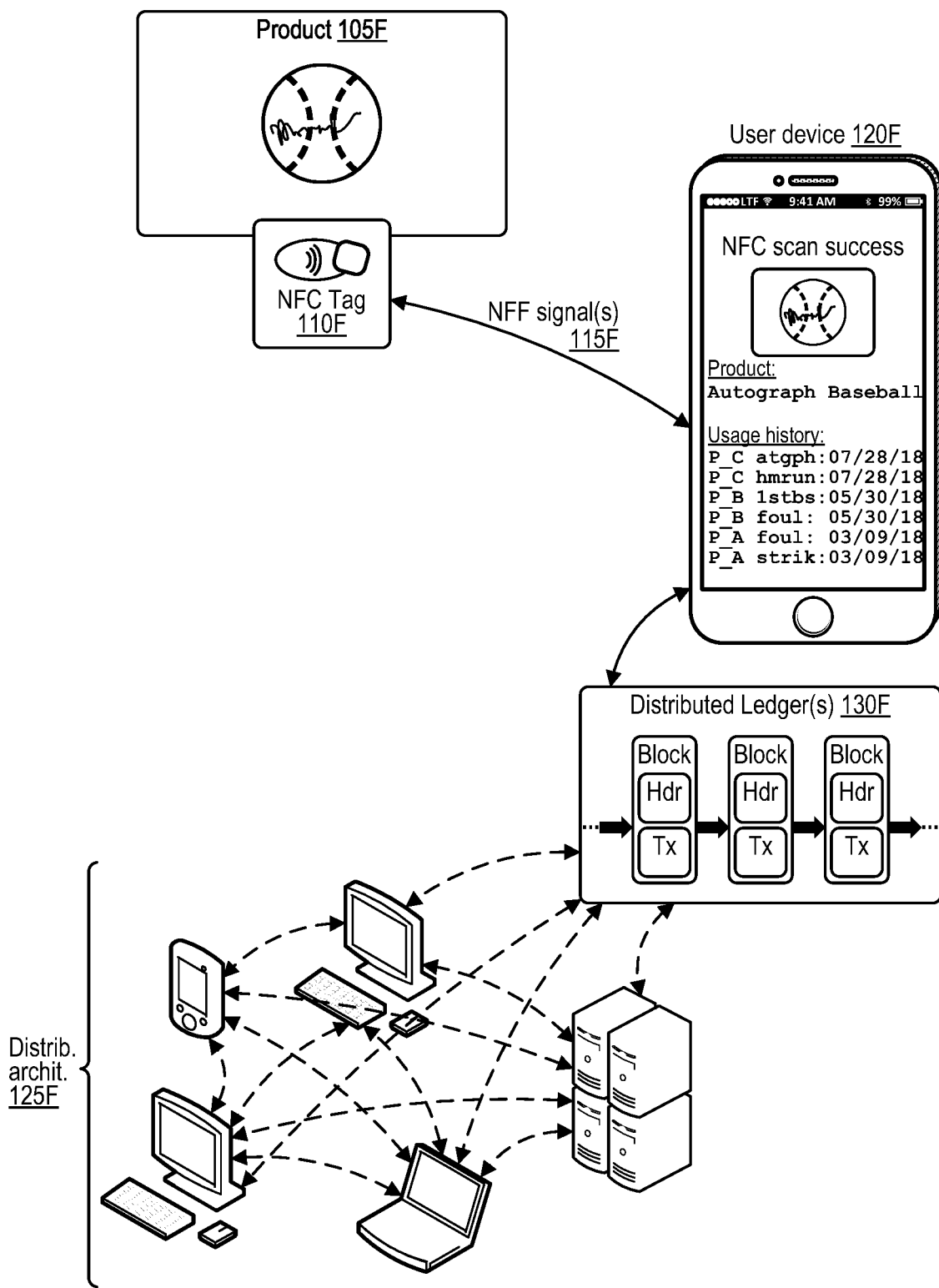
FIG. 1F illustrates retrieval of a usage history of a product as accessed from a distributed ledger using an NFC tag associated with the product.

FIG. 1F illustrates retrieval of a usage history of a product as accessed from a distributed ledger using an NFC tag associated with the product.

The product 105F illustrated in FIG. 1F is an autographed baseball, which has a usage history in various games. As with FIG. 1A-1E above, the NFC tag 110F may be coupled to the autographed baseball 105F itself or to packaging, such as a box, that at least partially contains the autographed baseball 105F. The identity of the product 105F as an autographed baseball may be stored in the NFC tag 110F and conveyed to the user device 120F via the wireless signals 115F, or may be stored in the distributed ledger(s) 130F and read by the user device 120F upon its retrieval, storage, and parsing of a copy of the distributed ledger(s) 130F.

The distributed ledger(s) 130F of FIG. 1F store(s), and the user device 110F of FIG. 1F reads, parses, and displays, that the autographed baseball 105F was used in a strike by Player_A on Mar. 9, 2018; that the autographed baseball 105F was used in a foul by Player_A on Mar. 9, 2018; that the autographed baseball 105F was used in a first base hit by Player_B on May 30, 2018; that the autographed baseball 105F was used in a home run hit by Player_C on Jul. 28, 2018; and that the autographed baseball 105F was autographed by Player_C on Jul. 28, 2018.

Different user devices 120F of the distributed architecture 125F may add transactions corresponding to these different uses of the autographed baseball 105F to the distributed ledger(s) 130F in the manner illustrated in FIG. 4A. Each of these devices may be computing devices 800 that are associated with use of the autographed baseball 105F, such as user devices 120F corresponding to baseball players using the autographed baseball 105F or to stadium staff at the stadiums at which the autographed baseball 105F is used, in a manner that is verifiable via public-private keypair as discussed above.

Figure 1G:
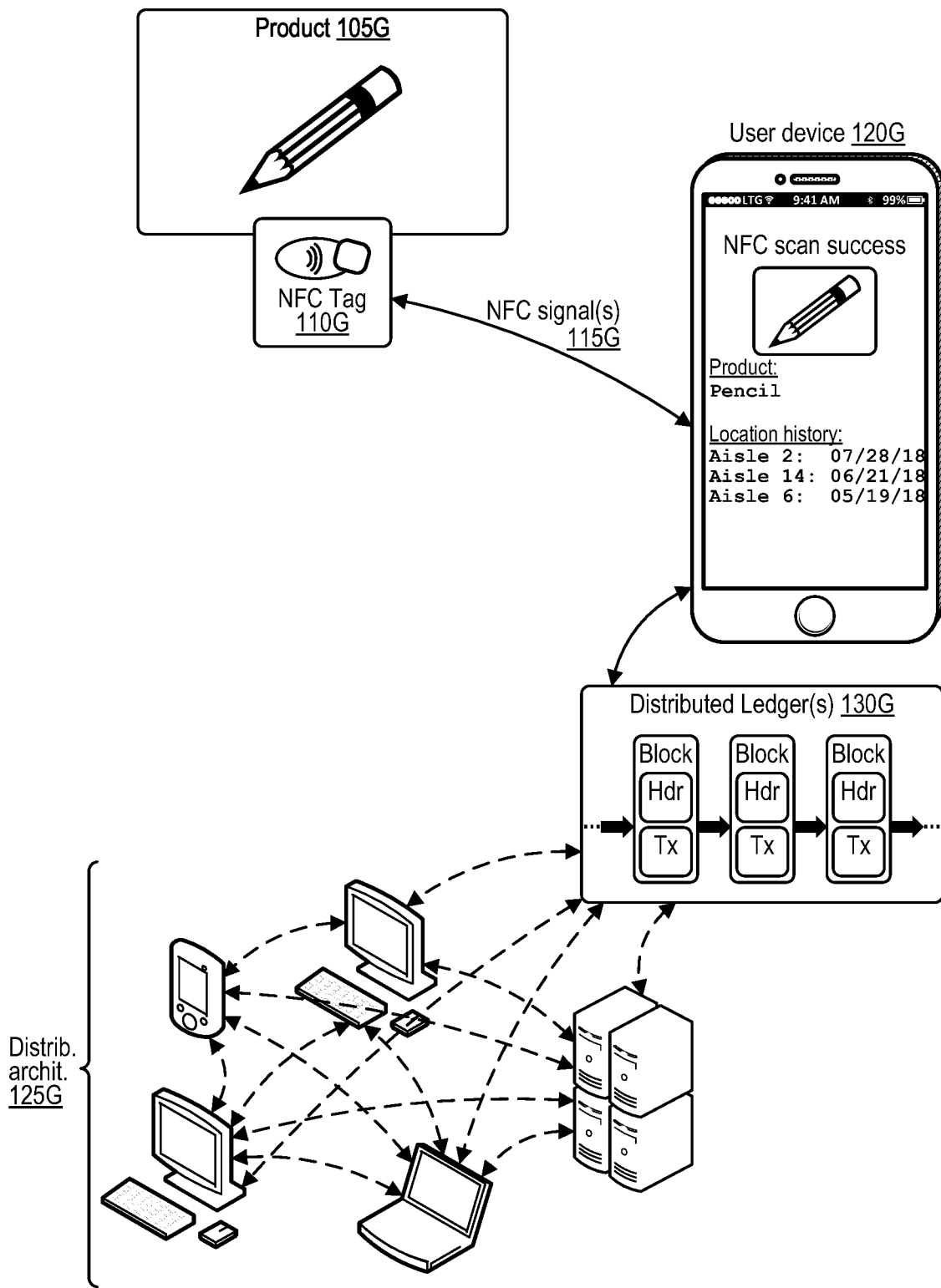
FIG. 1G illustrates retrieval of a location history of a product as accessed from a distributed ledger using an NFC tag associated with the product.

FIG. 1G illustrates retrieval of a location history of a product as accessed from a distributed ledger using an NFC tag associated with the product.

The product 105G illustrated in FIG. 1G is a pencil, which is moved to different aisles of a retail store or warehouse. As with FIG. 1A-1F above, the NFC tag 110G may be coupled to the pencil 105G itself or to packaging, such as a box, that at least partially contains the pencil 105G. The identity of the product 105G as a pencil may be stored in the NFC tag 110G and conveyed to the user device 120G via the wireless signals 115G, or may be stored in the distributed ledger(s) 130G and read by the user device 120G upon its retrieval, storage, and parsing of a copy of the distributed ledger(s) 130G.

The distributed ledger(s) 130F of FIG. 1G store(s), and the user device 110G of FIG. 1G reads, parses, and displays, that the pencil 105G was located in aisle 6 of the store or warehouse as of May 19, 2018; that the pencil 105G was located in aisle 14 of the store or warehouse as of Jun. 21, 2018; and that the pencil 105G was located in aisle 2 of the store or warehouse as of Jul. 28, 2018. While the term "aisle" is used for illustration, this could be used to convey rows, columns, coordinate systems (such as latitude and longitude), street names, or other indications of absolute or relative location/position.

Different user devices 120G of the distributed architecture 125G may add transactions corresponding to these different locations of the pencil 105G to the distributed ledger(s) 130G in the manner illustrated in FIG. 4A. Each of these devices may be computing devices 800 that are associated with positioning or moving of the pencil 105G, such as user devices 120G corresponding to retail employees that stock shelves of a retail store or to warehouse employees in charge of arranging items in a warehouse, user devices 120G that themselves move items in a retail store or warehouse, user devices 120G that provide tracking services such as GNSS receiver devices, or combinations thereof, in a manner that is verifiable via public-private keypair as discussed above.

Figure 2A:
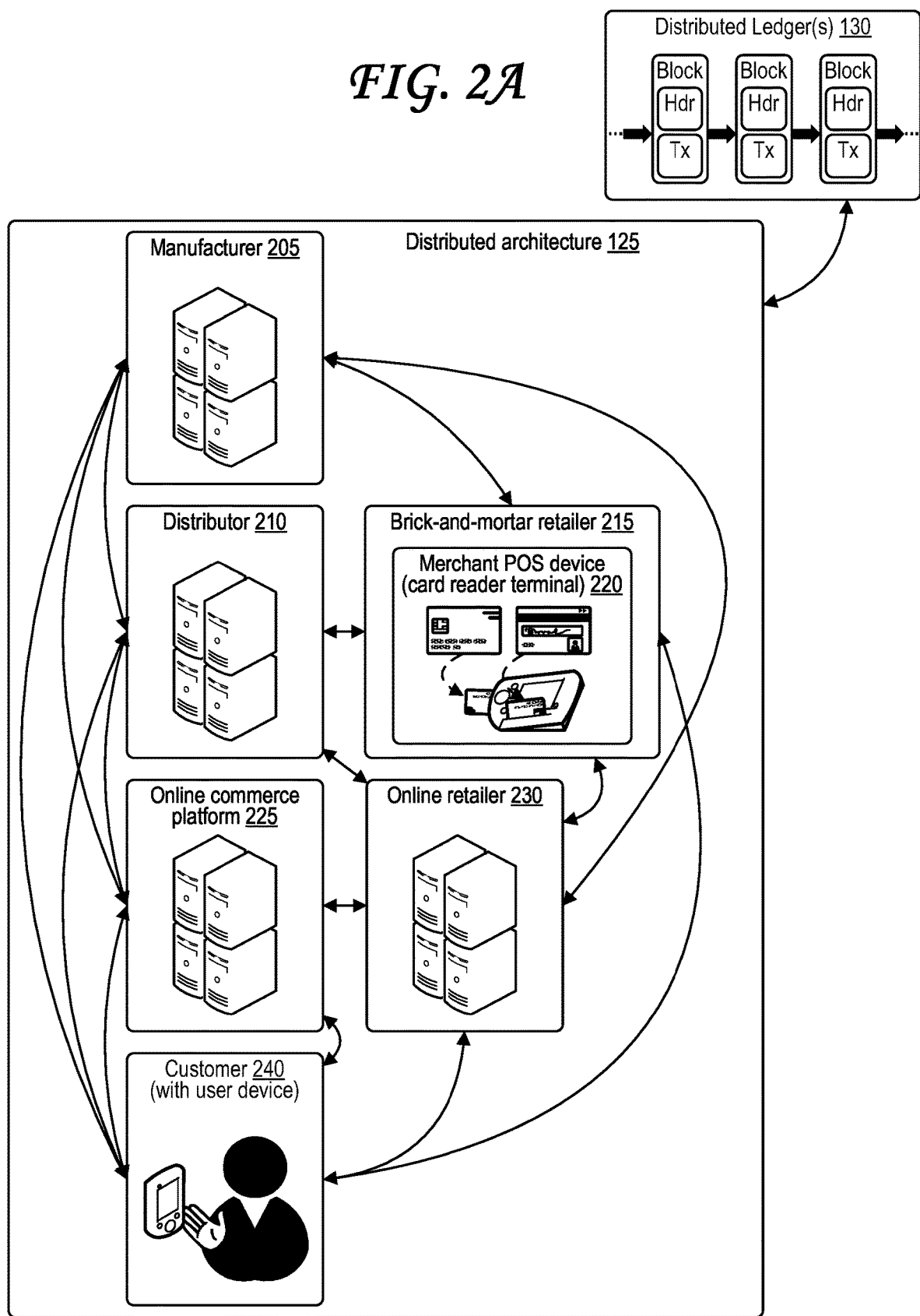
FIG. 2A illustrates a distributed architecture supporting the distributed ledger, the distributed architecture including different classes of devices along a commercial supply chain.

FIG. 2A illustrates a distributed architecture supporting the distributed ledger, the distributed architecture including different classes of devices along a commercial supply chain.

The distributed architecture 125 illustrated in FIG. 2A includes various computing devices 800 that each optionally store copies of various distributed ledger(s) 130, each of which may on occasion request transactions to be added to the distributed ledger(s) 130, verify requested transactions for the distributed ledger(s) 130, generate new blocks that each store one or more verified transactions for the distributed ledger(s) 130, append new blocks to the distributed ledger(s) 130, distribute new blocks to the other computing devices 800 of the distributed architecture 125, or combinations thereof. Each of these computing devices 800 of the distributed architecture 125 may also be referred to as a user device 120 corresponding to a particular user or type of user.

The computing devices 800 of the distributed architecture 125 illustrated in FIG. 2A include: one or more manufacturer devices 205 corresponding to one or more manufacturers of a product 105, one or more distributor devices 210 corresponding to one or more distributors that distribute the product 105, one or more physical (brick-and-mortar) retailer devices 215 corresponding to one or more physical (brick-and-mortar) retailers selling the product 105, one or more online commerce platform devices 225 corresponding to one or more online commerce platforms helping sell the product 105, one or more online retailer devices 230 corresponding to a one or more online retailers selling the product 105, or one or more customer user devices 240 corresponding to a one or more customers purchasing the product 105. The physical (brick-and-mortar) retailer devices 215 corresponding to a one or more physical (brick-and-mortar) retailers of a product 105 may, for example, be point of sale (POS) devices 220 such as card reader terminals capable of reading payment instruments such as magnetic stripe cards, integrated circuit chip (ICC) cards, or NFC payment instruments.

The various arrows between the computing devices 800 of the distributed architecture 125 illustrated in FIG. 2A indicate potential paths that the product 105 can take. The manufacturer(s) 205 can give the product 105 directly to any of the other entities illustrated in FIG. 2A. The customer can buy the product 105 directly from the manufacturer 205, from the distributor 210, from the physical retailer 215, from the online commerce platform 225, from the online retailer 230, or from another customer 240. All of the entities in between the manufacturer 205 and customer 240 can distribute the product 105 amongst themselves; even physical retailers sometime have corresponding online storefronts with which they can share products 105 offered to customers 240.

The online commerce platform device(s) 225 and/or online retailer device(s) 230 may also be referred to, either individually or together, as an ordering website network.

Figure 2B:
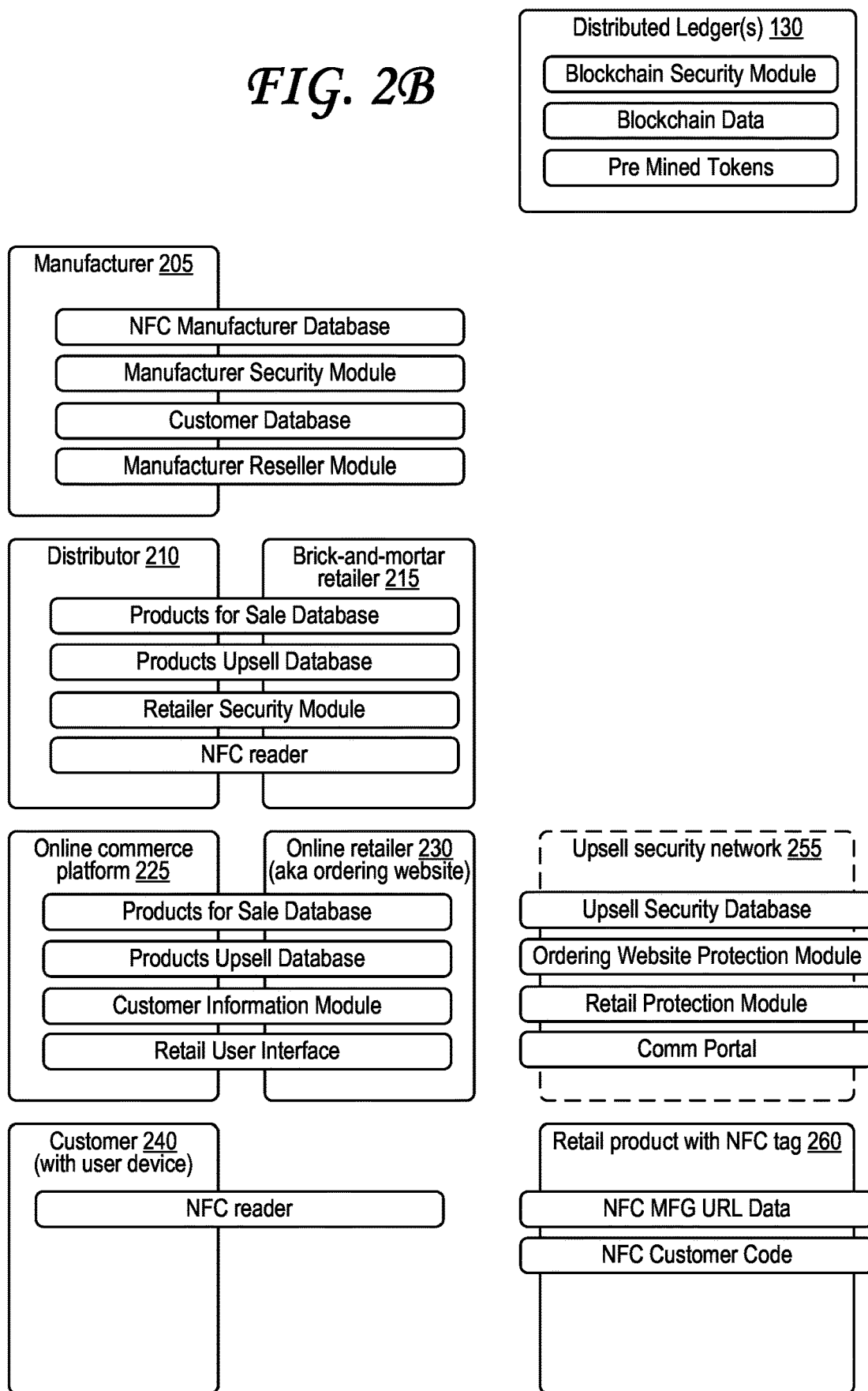
FIG. 2B illustrates elements optionally included among the devices in the distributed architecture of FIG. 2A.

FIG. 2B illustrates elements optionally included among the devices in the distributed architecture of FIG. 2A.

The optional databases, components, and modules illustrated in FIG. 2B represent data structures for storing information, such as those of FIG. 13 and FIG. 16, hardware devices/components, and/or software modules that are stored by and run on the devices that they are illustrated over to provide functionality discussed in the flow diagrams of FIG. 9, FIG. 10, FIG. 11, FIG. 12, FIG. 14, FIG. 15, FIG. 17, and FIG. 18.

The manufacturer device(s) 205 may include a NFC Manufacturer Database, a Manufacturer Security Module, a Customer Database, and a Manufacturer Reseller Module. The distributor device(s) 210 and/or physical retailer device(s) 215 may include Products for Sale Database, a Products Upsell Database, a Retailer Security Module, and an NFC reader. The online commerce platform device(s) 225 and/or online retailer device(s) 230 may include Products for Sale Database, a Products Upsell Database, a Customer Information Module, and a Retail User Interface. The customer user device 240 may include an NFC reader. A product 105 or object 105 with an NFC tag 110, which may be collectively referred as a product 260 or object 260, may include NFC Manufacturing URL Data—that is, an address (e.g., Uniform Resource Locator or URL or another type of hyperlink or pointer) of one or more distributed ledger(s) 130 relevant to the object 260—and may also include an NFC customer code or NFC code as discussed above. The distributed architecture may optionally also include one or more computing devices 800 referred to as an upsell security network 255, which may store information about groupings of related products (see e.g., FIG. 1F) and which may include an Upsell Security Database, an Ordering Website Protection Module, a Retail Protection Module, and a Comm Portal.

The distributed ledger(s) 130 themselves may each include or correspond to blockchain data (e.g., headers and transactions), pre-mined tokens (e.g., cryptocurrency as discussed in step 730 of FIG. 7A), and a blockchain security module for using the distributed ledger(s) 130 as a way to securely store information about the transactions discussed herein.

FIG. 3 illustrates a portion of a blockchain ledger that implements distributed product transaction tracking and authentication. Three blocks—Block A 305, Block B 335, and Block C 365—of the blockchain ledger 300 are illustrated in FIG. 3.

Each block includes a block header 310/340/370 and a list of one or more transactions 330/360/390. The block header 310 includes a hash of the block header of the previous block 315/345/375, which may alternately be replaced or supplemented by a hash of the entire previous block. For instance, the header 370 of block C 365 includes a hash 375 of the header 340 of block B 335. The header 340 of block B 335 likewise includes a hash 345 of the header 310 of block A 305. The header 310 of block A 305 likewise includes a hash 315 of a header (not pictured) of previous block (not pictured) that is before block A 305 in the blockchain 300. Including the hash of the previous block's header secures the blockchain ledger 300 by preventing modification of any block of the blockchain 300 after the block has been entered into the blockchain 300, as any change to a particular block would cause that block header's hash in the next block to be incorrect. Further, modification of that block header's hash in the next block would make the next block's header's hash in the block after the next block incorrect, and so forth.

Figure 5:
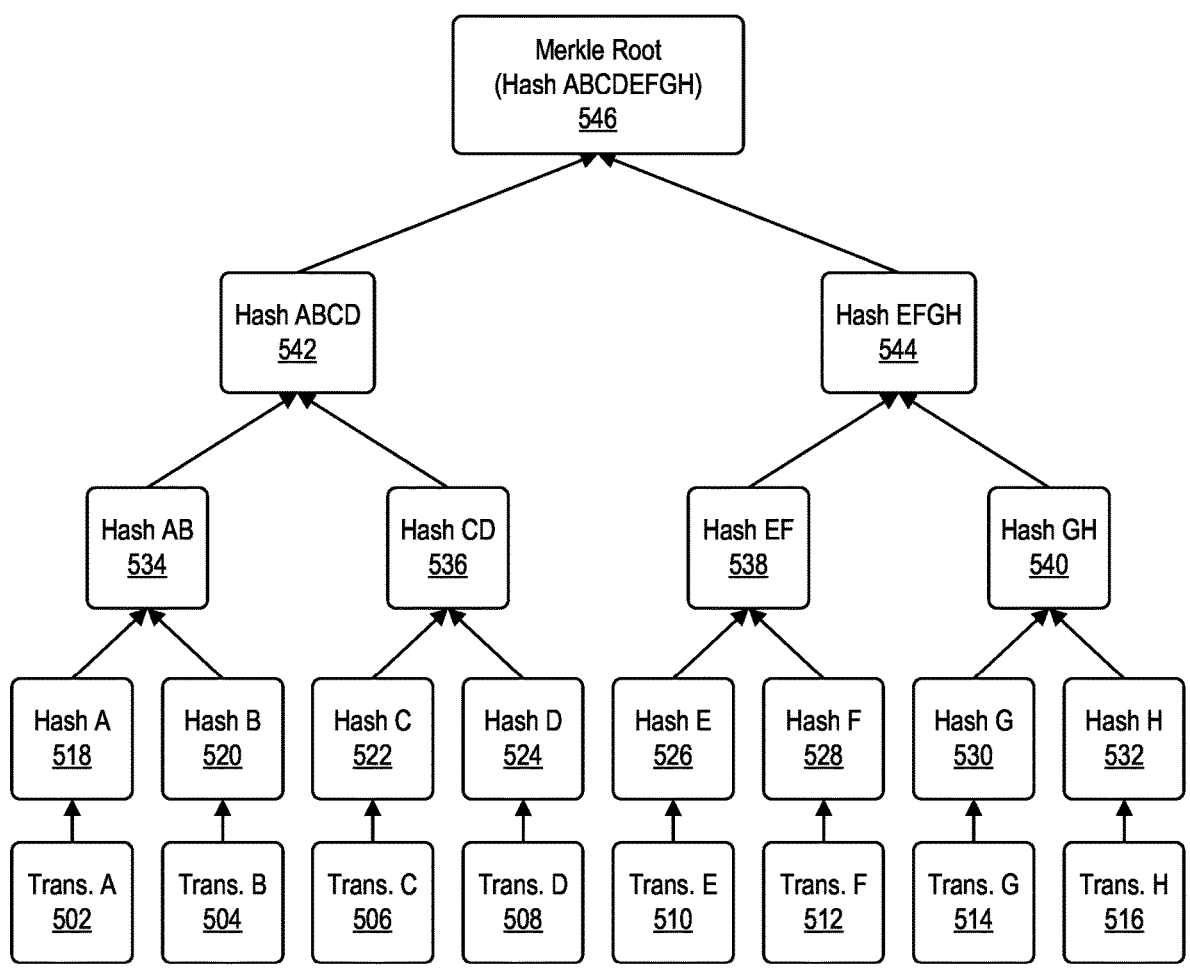
FIG. 5 is a diagram of a Merkle tree for securing product transaction tracking and authentication using the distributed ledger.

Each block's block header 310/340/370 also includes a Merkle root 320/350/380, which is generated based on hashes of the transaction(s) listed in the list of transaction(s) 330/360/390 for that block as explained further with respect to FIG. 5. Any attempt to modify a transaction after the block has been entered would change the Merkle root 320/350/380, which would change the hash 315/345/375 of the block header 310/340/370, again allowing all nodes to see if any block has been tampered with.

Figure 7A:
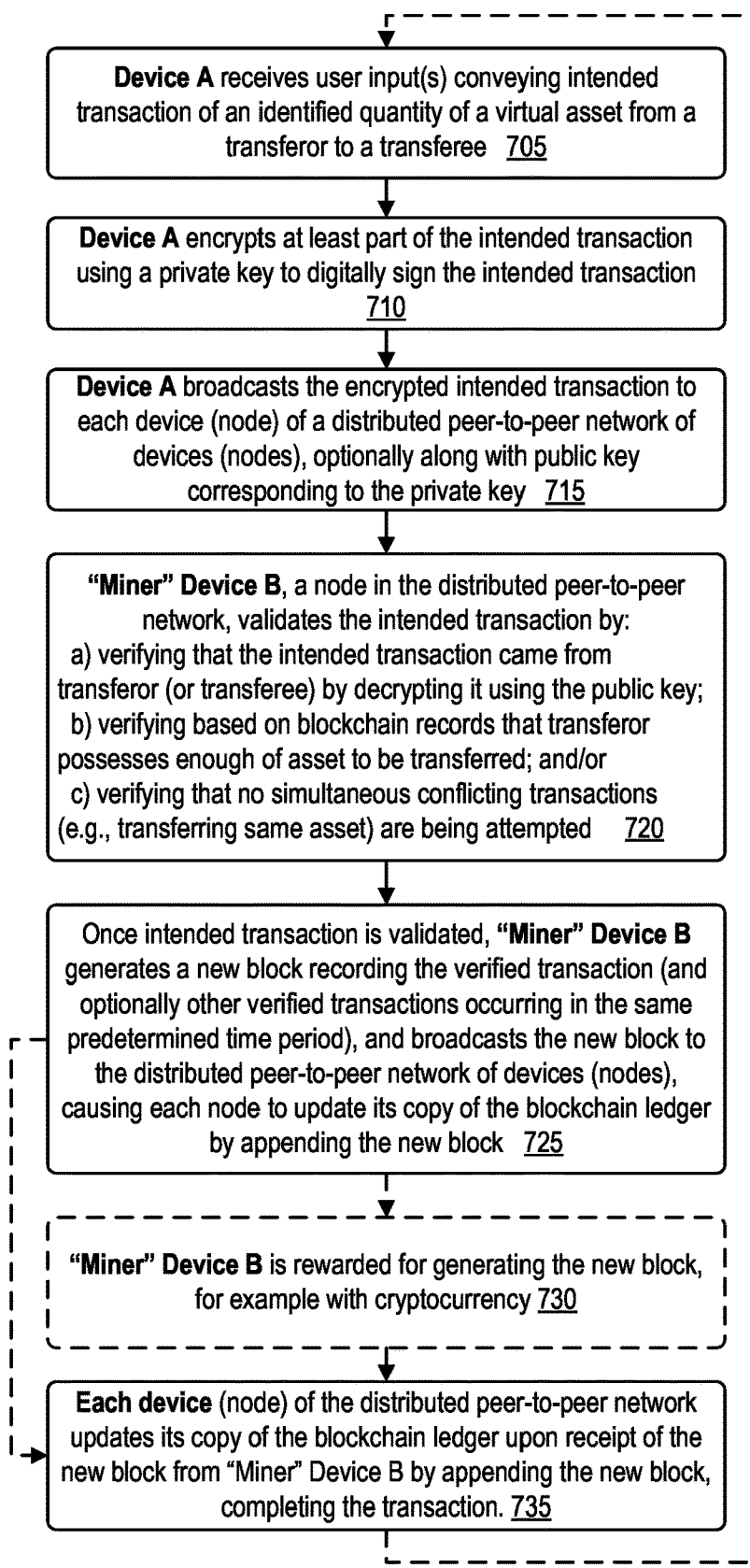
FIG. 7A is a flow diagram illustrating operations through which a new block is generated for the distributed ledger.

Each block's block header 310/340/370 may also include various elements of metadata, such as a version number for the blockchain ledger platform, a version number for the block itself that identifies how many nonces have been tried, a timestamp for verification of each transaction, a timestamp for generation of the block, a difficulty target value as discussed with respect to FIG. 7A AND FIG. 7B, a nonce value as discussed with respect to FIG. 7A AND FIG. 7B, or a combination thereof.

Each block 305/335/365 of the blockchain 300 also includes a list of one or more transaction(s) 330/360/390. Each of these transactions 330/360/390 may be identified in a similar matter to the transactions 410 or 425 of FIG. 4A and FIG. 4B. These transactions may convey information corresponding to, for example, an ownership history as in FIG. 1A, a shipping history as in FIG. 1B, a manufacturing history as in FIG. 1C, a distribution history as in FIG. 1D, a history of user purchases of related products as in FIG. 1E, an item usage history as in FIG. 1F, a location/position history as in FIG. 1G, other characteristics or conditions of a product/object/item 105 that change over time, or combinations thereof.

While FIG. 3 only illustrates three blocks 305/335/365 of the blockchain 300, it should be understood that any blockchain discussed herein may be longer or shorter in that it may have more or fewer than three blocks.

FIG. 4A illustrates transactions related to supply chain stages of three items as recorded via distributed ledger.

Box 405 of FIG. 4A identifies which supply chain stages include which of the three items before the transactions 410. In particular, box 405 indicates that entity MANUFACTURE_BEGINS corresponding to the start of the manufacturing process includes 1 of ITEM_A and 0 of ITEM_B and ITEM_C; entity MANUFACTURE_COMPLETE corresponding to the completion of the manufacturing process includes 0 of ITEM_A and ITEM_B and ITEM_C; entity QUALITY_ASSURANCE corresponding to the quality assurance process includes 0 of ITEM_A and ITEM_B and ITEM_C; entity DISTRIBUTION_SHIPPING corresponding to the shipping of an item for distribution and includes 0 of ITEM_A and ITEM_B and ITEM_C; entity DISTRIBUTION_DELIVERY corresponding to the delivery of an item for distribution includes 0 of ITEM_A and ITEM_B and ITEM_C; entity STOCKED_LOCALLY corresponding to the stocking of an item at an online or physical retail location includes 0 of ITEM_A and ITEM_B and ITEM_C; entity PURCHASED_BY_CUSTOMER corresponding to an item being purchased from an online or physical retailer by a customer includes 1 of ITEM_B and 0 of ITEM_A and ITEM_C; entity CUSTOMER_SHIPPING corresponding to an item being shipped to a customer includes 1 of ITEM_C and 0 of ITEM_A and ITEM_B; and entity CUSTOMER_DELIVERY corresponding to an item being delivered to a customer includes 0 of ITEM_A and ITEM_B and ITEM_C. Thus, one of ITEM_A has begun manufacturing, one of ITEM_B was purchased by a customer, and one of ITEM_C was shipped to a customer.

The transactions 410 of FIG. 4A each identify a value of a transfer, a transferee entity, a transferor entity, and a signature, which may be a hash of the transaction of any of the hash types discussed herein at least with respect to FIG. 5. The first of the transactions 410 (with signature BA7816BF8F01CFEA414) indicates that one of ITEM_A is to be transferred from entity MANUFACTURE_BEGINS to entity MANUFACTURE_COMPLETE, indicating that manufacture of the one of ITEM_A that had begun in the time state characterized by box 405 has now completed. The second of the transactions 410 (with signature AB8896967C7979F976G) indicates that one of ITEM_B is to be transferred from entity PURCHASED_BY_CUSTOMER to entity CUSTOMER_SHIPPING, indicating that the one of ITEM_B that had been purchased by a customer in the time state characterized by box 405 has now been shipping to the customer. The third of the transactions 410 (with signature GA8796F79879876C977) indicates that one of ITEM_C is to be transferred from entity CUSTOMER- _SHIPPING to entity CUSTOMER_DELVERY, indicating that the one of ITEM_C that had been shipped to a customer in the time state characterized by box 405 has now been delivered to the customer. The transactions 410 can be grouped into a single block of a distributed ledger 130 such as the blockchain ledger of FIG. 3 or into multiple blocks.

Box 415 of FIG. 4A identifies which supply chain stages include which of the three items after the transactions 410. In particular, box 405 indicates that entity MANUFACTURE_BEGINS corresponding to the start of the manufacturing process includes 0 of ITEM_A and ITEM_B and ITEM_C; entity MANUFACTURE_COMPLETE corresponding to the completion of the manufacturing process includes 1 of ITEM_A and 0 of ITEM_B and ITEM_C; entity QUALITY_ASSURANCE corresponding to the quality assurance process includes 0 of ITEM_A and ITEM_B and ITEM_C; entity DISTRIBUTION_SHIPPING corresponding to the shipping of an item for distribution and includes 0 of ITEM_A and ITEM_B and ITEM_C; entity DISTRIBUTION_DELIVERY corresponding to the delivery of an item for distribution includes 0 of ITEM_A and ITEM_B and ITEM_C; entity STOCKED_LOCALLY corresponding to the stocking of an item at an online or physical retail location includes 0 of ITEM_A and ITEM_B and ITEM_C; entity PURCHASED_BY_CUSTOMER corresponding to an item being purchased from an online or physical retailer by a customer includes 0 of ITEM_A and ITEM_B and ITEM_C; entity CUSTOMER_SHIPPING corresponding to an item being shipped to a customer includes 1 of ITEM_B and 0 of ITEM_A and ITEM_C; and entity CUSTOMER_DELIVERY corresponding to an item being delivered to a customer includes 1 of ITEM_C and 0 of ITEM_A and ITEM_B. Thus, the one of ITEM_A referenced in box 405 and the first of the transactions 410 has completed manufacturing, the one of ITEM_B referenced in box 405 and the second of the transactions 410 was shipped to the customer, and the one of ITEM_C referenced in box 405 and the third of the transactions 410 was delivered to the customer.

Figure 4B:
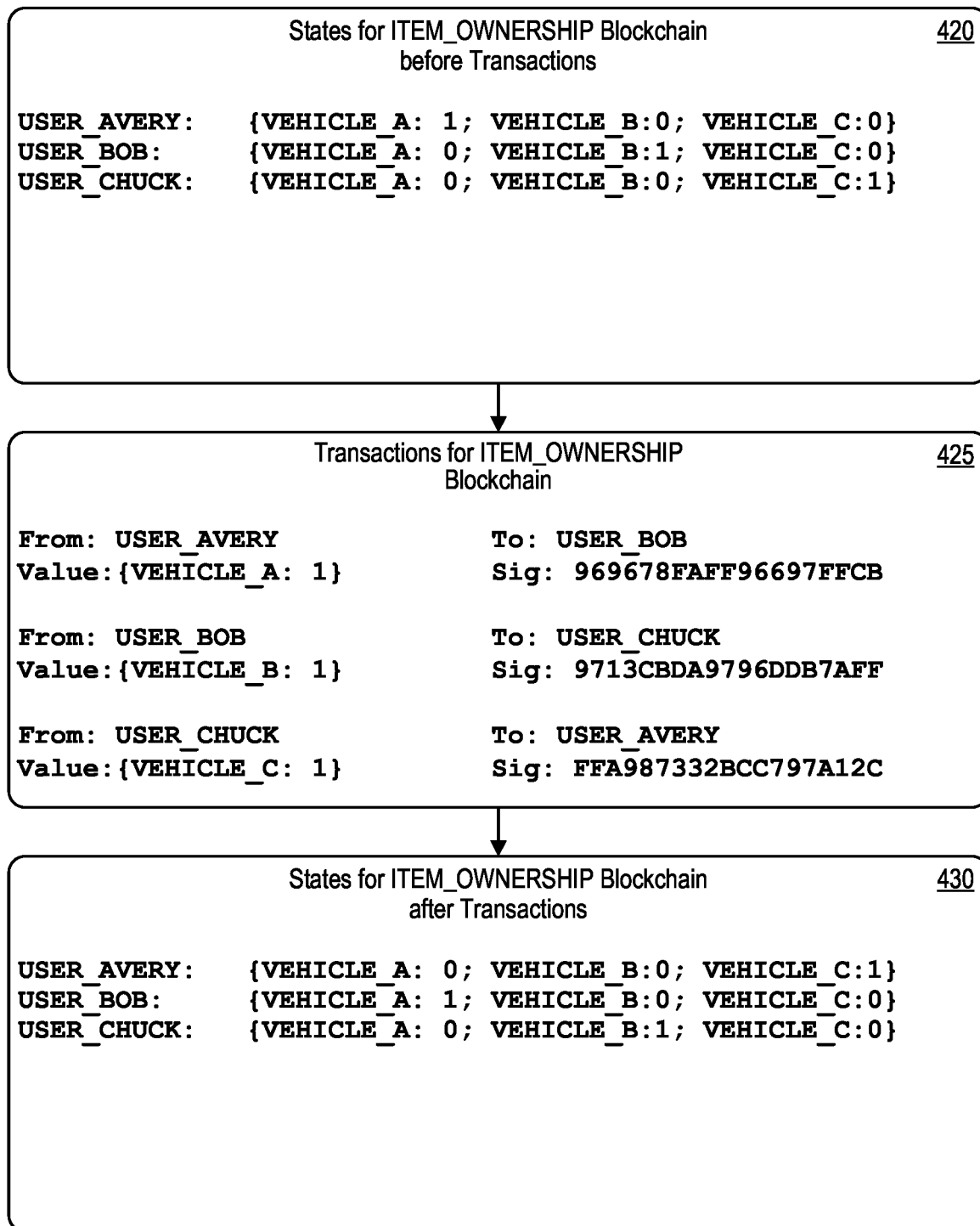
FIG. 4B illustrates transactions related to ownership of three vehicles as recorded via distributed ledger.

FIG. 4B illustrates transactions related to ownership of three vehicles as recorded via distributed ledger.

Box 420 of FIG. 4B identifies which of three users possess which of three vehicle items before the transactions 425. In particular, box 420 indicates that entity USER_AVERY corresponding to the user "Avery" possesses 1 one VEHICLE_A and 0 of VEHICLE_B and VEHICLE_C; entity USER_BOB corresponding to the user "Bob" possesses 1 one VEHICLE_B and 0 of VEHICLE_A and VEHICLE_C; and entity USER_CHUCK corresponding to the user "CHUCK" possesses 1 one VEHICLE_C and 0 of VEHICLE_A and VEHICLE_B. Thus, Avery has one of VEHICLE_A, Bob has one of VEHICLE_B, and Chuck has one of VEHICLE_C.

The transactions 425 of FIG. 4B each identify a value of a transfer, a transferee entity, a transferor entity, and a signature, which may be a hash of the transaction of any of the hash types discussed herein at least with respect to FIG. 5. The first of the transactions 425 (with signature 969678FAFF96697FFCB) indicates that one of VEHICLE_A is to be transferred from entity USER_AVERY to entity USER_BOB, indicating that user Avery has sold or otherwise given a Vehicle A to user Bob. The second of the transactions 425 (with signature 9713CBDA9796DDB7AFF) indicates that one of VEHICLE_B is to be transferred from entity USER_BOB to entity USER_CHUCK, indicating that user Bob has sold or otherwise given a Vehicle B to user Chuck. The third of the transactions 425 (with signature FFA987332BCC797A12C) indicates that one of VEHICLE_C is to be transferred from entity USER_CHUCK to entity USER_AVERY, indicating that user Chuck has sold or otherwise given a Vehicle C to user Avery. The transactions 425 can be grouped into a single block of a distributed ledger 130 such as the blockchain ledger of FIG. 3 or into multiple blocks.

Box 430 of FIG. 4B identifies which of the three users possess which of the three vehicle items after the transactions 425. In particular, box 420 indicates that entity USER_AVERY corresponding to the user "Avery" possesses 1 one VEHICLE_C and 0 of VEHICLE_A and VEHICLE_B; entity USER_BOB corresponding to the user "Bob" possesses 1 one VEHICLE_A and 0 of VEHICLE_B and VEHICLE_C; and entity USER_CHUCK corresponding to the user "CHUCK" possesses 1 one VEHICLE_B and 0 of VEHICLE_A and VEHICLE_C. Thus, Avery has one of VEHICLE_C, Bob has one of VEHICLE_A, and Chuck has one of VEHICLE_B.

FIG. 5 is a diagram of a Merkle tree for securing product transaction tracking and authentication using the distributed ledger.

The Merkle tree of FIG. 5 is used to generate a Merkle root 546 for a block with 8 transactions: transaction A 502, transaction B 504, transaction C 506, transaction D 508, transaction E 510, transaction F 512, transaction G 514, and transaction H 516.

A hash is generated for each transaction. Transaction A 502 is hashed into hash A 518, transaction B 504 is hashed into hash B 520, transaction C 506 is hashed into hash C 522, transaction D 508 is hashed into hash D 524, transaction E 510 is hashed into hash E 526, transaction F 512 is hashed into hash F 528, transaction G 514 is hashed into hash G 530, and transaction H 516 is hashed into hash H 532.

Each of the hashes A 518 through H 532 are hashed after being paired with another hash. That is, Hash A 518 and Hash B 520 are hashed together into Hash AB 534, Hash C 522 and Hash D 524 are hashed together into Hash CD 536, Hash E 526 and Hash F 528 are hashed together into Hash EF 538, and Hash G 530 and Hash H 532 are hashed together into Hash GH 540.

This process repeats until a single hash results. That is, Hash AB 534 and Hash CD 536 are hashed together into Hash ABCD 542, and Hash EF 538 and Hash GH 540 are hashed together into Hash EFGH 544. Hash ABCD 542 and Hash EFGH 544 are hashed together into Hash ABCDEFGH 546. Hash ABCDEFGH 546 is also known as the Merkle root 546 for the 8 transactions: transaction A 502, transaction B 504, transaction C 506, transaction D 508, transaction E 510, transaction F 512, transaction G 514, and transaction H 516. Any modification to any of these 8 transactions also necessarily changes the Merkle root 546, which can be verified by any node to ensure that no changes were made to the transactions in any given block.

Figure 6:
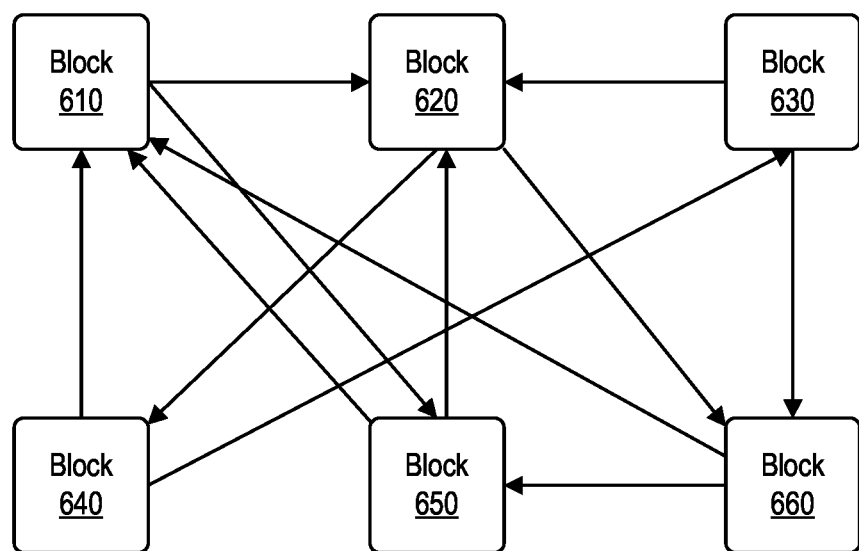
FIG. 6 illustrates a portion of a distributed directed acyclic graph (DAG) ledger that implements distributed product transaction tracking and authentication.

The hashes used in the Merkle root calculation of FIG. 5, the hashes of previous block discussed with respect to FIG. 3, and the hashes of parent blocks discussed with respect to FIG. 6, are generated using a hash algorithm, which may optionally be a secure hash algorithm (SHA), such as SHA-0, SHA-1, SHA-2, SHA-3, SHA-N, SHA-128, SHA-192, SHA-256, SHA-512, SHA-224, SHA-384, SHA-512/224, SHA-512/256, SHA3-224, SHA3-256, SHA3-384, SHA3-512, SHAKE128, or one or more variants or combinations thereof.

FIG. 6 illustrates a portion of a distributed directed acyclic graph (DAG) ledger that implements distributed product transaction tracking and authentication.

While FIG. 3, FIG. 7A, and FIG. 7B discuss use of a blockchain ledger, it should be understood that a non-linear ledger structure, such as the directed acyclic graph (DAG) ledger structure of FIG. 6, may be used instead of a blockchain ledger discussed herein. That is, the term "distributed ledger" as used herein should be understood to refer to at least one of a blockchain ledger (as in FIG. 3), a DAG ledger (as in FIG. 6), or a combination thereof. In a DAG ledger, each block header includes the hashes of block headers of a predetermined number of other "parent" blocks in the DAG ledger selected either at random or in some other non-linear manner, rather than the hash of a single previous block in the blockchain. Each block header may alternately or additionally include hashes of the entire parent blocks instead of hashes of just the headers of the parent blocks. Where each block header includes multiple hashes corresponding to different parent blocks or their headers, these hashes can be combined together into a Merkle root much like the hashes A 518, B 520, C 522, D 524, E 526, F 528, G 530, and H 532 of FIG. 5.

For example, in the DAG ledger of FIG. 6, the predetermined number is two, at least after the first two blocks are generated. In the web DAG ledger of FIG. 6, the parent blocks are indicated using arrows. Block 610 includes hashes of the block headers of parent blocks 620 and 650. Block 620 includes hashes of the block headers of parent blocks 640 and 660. Block 630 includes hashes of the block headers of parent blocks 620 and 660. Block 640 includes hashes of the block headers of parent blocks 610 and 630. Block 650 includes hashes of the block headers of parent blocks 610 and 620. Block 660 includes hashes of the block headers of parent blocks 610 and 650. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some cases, the number of parent blocks in a DAG ledger is not strictly predetermined, but there is a predetermined minimum number of blocks, such as a two-parent minimum or a one-parent minimum, meaning that each block has at least the predetermined minimum number of parent blocks. In some cases, each block in a DAG ledger may only identify only a single transaction rather than multiple transactions, and may therefore forego a Merkle root and/or replace it with a hash of the single transaction. In other implementations, each block may identify multiple transactions associated with a predetermined time period as discussed herein.

Potential benefits of distributed DAG ledgers over blockchain ledgers may include parallelized validation, which results in higher throughput.

FIG. 7A is a flow diagram illustrating operations through which a new block is generated for the distributed ledger.

At step 705, a device A associated with a user account A receives user input(s) conveying an intended transaction of an identified quantity of a virtual asset from a transferor (e.g., a transferor user account or other entity) to a transferee (e.g., a transferee user account or other entity). In most cases, user account A must be the transferor account for the intended transaction to proceed, but in some cases it may alternately be the transferee account. In some cases, user account A may even be a third party account other than the transferor and transferee, such as an account corresponding to a platform, a bank, an intermediary, or an adjudicative entity for transactions, or other third party account having heightened power over transactions.

At step 710, Device A associated with user account A encrypts at least part of the intended transaction using a private key associated with user account A to digitally sign the intended transaction.

At step 715, Device A broadcasts or otherwise transmits the encrypted intended transaction to each device (node) of a distributed peer-to-peer network of devices (nodes), optionally along with a public key corresponding to the private key used to digitally sign the transaction in step 710. Nodes receiving the public key may verify it against a key stored via a CA, or may verify a hash of the public key against a hash of a public key stored via the CA. Alternately, nodes may simply acquire the public key from the CA. The nodes may thereby verify that the intended transaction broadcast at step 715 was indeed digitally signed at step 710 by the user account A with the private key corresponding to user account A.

At step 720, a "Miner" Device B, a node in the distributed peer-to-peer network, validates the intended transaction in one or more of three ways.

The "Miner" Device B may decrypt the intended transaction using the public key to verify that it was indeed digitally signed at step 710 by the user account A with the private key corresponding to user account A, and may optionally verify that user account A is a the transferor account, transferee account, or another account authorized to request the transaction in question.

The "Miner" Device B may identify, based on existing records in the distributed ledger 130, that the transferor account possesses at least the identified quantity of the asset to be transferred.

The "Miner" Device B may identify that the transferor acct is not trying to perform a simultaneous conflicting transfer, such as one that would leave the transferor account lacking the identified quantity of the virtual asset to be transferred. That is, the "Miner" Device B may check that if all intended transactions involving the transferor account were to complete, the transferor account would be left with a non-negative (greater than or equal to zero) quantity of the virtual asset.

At step 725, once the intended transaction (and optionally other transactions in same time predetermined period) is validated as in step 720, the "Miner" Device B generates a block recording the verified transaction (and optionally other verified transactions in same predetermined time period), and broadcasts the block to the distributed peer-to-peer network of devices (nodes), thereby allowing each device (node) to update its copy of the blockchain ledger by appending the new block.

At optional step 730, the "Miner" Device B is rewarded for successfully generating the new block, for example by granting an account corresponding to "Miner" Device B with a virtual asset such as a cryptocurrency. This is detailed further in FIG. 7B.

At step 735, each device (node) of the distributed peer-to-peer network updates its copy of the blockchain ledger upon receipt of the new block from "Miner" Device B by appending the new block. The transaction is now complete.

Consensus among the nodes of the distributed network regarding new blocks can be achieved using a practical byzantine fault tolerance (PBFT) algoritm, a proof-of-work (PoW) algorithm, a proof-of-stake (PoS) algorithm, a delegated proof-of-stake (DPoS) algorithm, a proof-of-activity (PoA) algorithm, a proof-of-burn (PoB) algorithm, a proofof-capacity (PoC) algorithm, a proof-of-storage (PoSt) algorithm, a proof-of-space (PoSp) algorithm, a proof-of-elapsed-time (PoET) algorithm, or a combination thereof.

While the discussions of FIG. 3, FIG. 7A, and FIG. 7B discuss transfer of virtual assets, it should be understood that these virtual assets may represent physical assets, so that ownership of the virtual asset implies ownership of the corresponding physical asset. For example, in FIG. 4A, ownership of the virtual asset VEHICLE_A implies ownership of a corresponding vehicle referred to as "Vehicle A."

FIG. 7B is a flow diagram illustrating operations through which generation of a new blocks for the distributed ledger is optionally incentivized.

Optional steps 745 and 750 and equation 755 of FIG. 7B expand on step 730 of FIG. 7A. At optional step 730 of FIG. 7A, the "Miner" Device B was rewarded for successfully generating the new block, for example by granting an account corresponding to "Miner" Device B with a virtual asset such as a cryptocurrency. The cryptocurrency may have real value and be exchangeable for real fiat currency, may be used as a virtual currency exclusively usable in a particular software application or at a particular online retailer or physical retailer, or some combination thereof. The generation and transfer of cryptocurrency to reward "Miner" Device B may be identified as a transaction in the next block that will be generated after the block generated by "Miner" Device B at step 725. Similarly, the block generated by "Miner" Device B at step 725 may identify a previous "Miner" Device that generated a previous block in the blockchain and may generate and transfer a similar reward to that "Miner" Device.

Step 745 explains that generating a new block to add to the blockchain can be made to be intentionally difficult if "miner" devices/nodes are to be rewarded as in step 730. A predetermined numeric (decimal or hexadecimal) difficulty target value may be used. To successfully generate a new block, a hash of the block (or block header) should be numerically less than the difficulty target value for the new block to be successful. Each "miner" device/node can try hashing the new block with various different nonce values in the metadata 325/355/385 of the block header in an attempt to find a nonce value that makes the hash of the whole block (or block header) be numerically less than the difficulty target value.

Step 750 explains that the difficulty target value can stay constant during a predetermined time period, such as 2 weeks. Just before the predetermined time period ends and before the next time period starts, difficulty target value is potentially adjusted up or down slightly, using the formula identified in block 755 or a similar formula. In some cases, a predetermined upper and lower bound may be set on how much the difficulty target value may be adjusted by.

The formula identified in block 755 identifies that (new adjusted difficulty target value)=(previous difficulty target value)×((predetermined time period)/(total transaction time for N transactions during predetermined time period)). N is defined as ((predetermined time period)/(desired block generation time)).

If the time period is 2 weeks (20160 minutes) and each block should take approximately 10 minutes to generate, N is ((20160 minutes)/(10 minutes))=2016. Thus, one might calculate the new adjusted difficulty target value as (new adjusted difficulty target value)=(previous difficulty target value) x ((20160 minutes)/(total transaction time for 2016 transactions during predetermined time period)).

Figure 8:
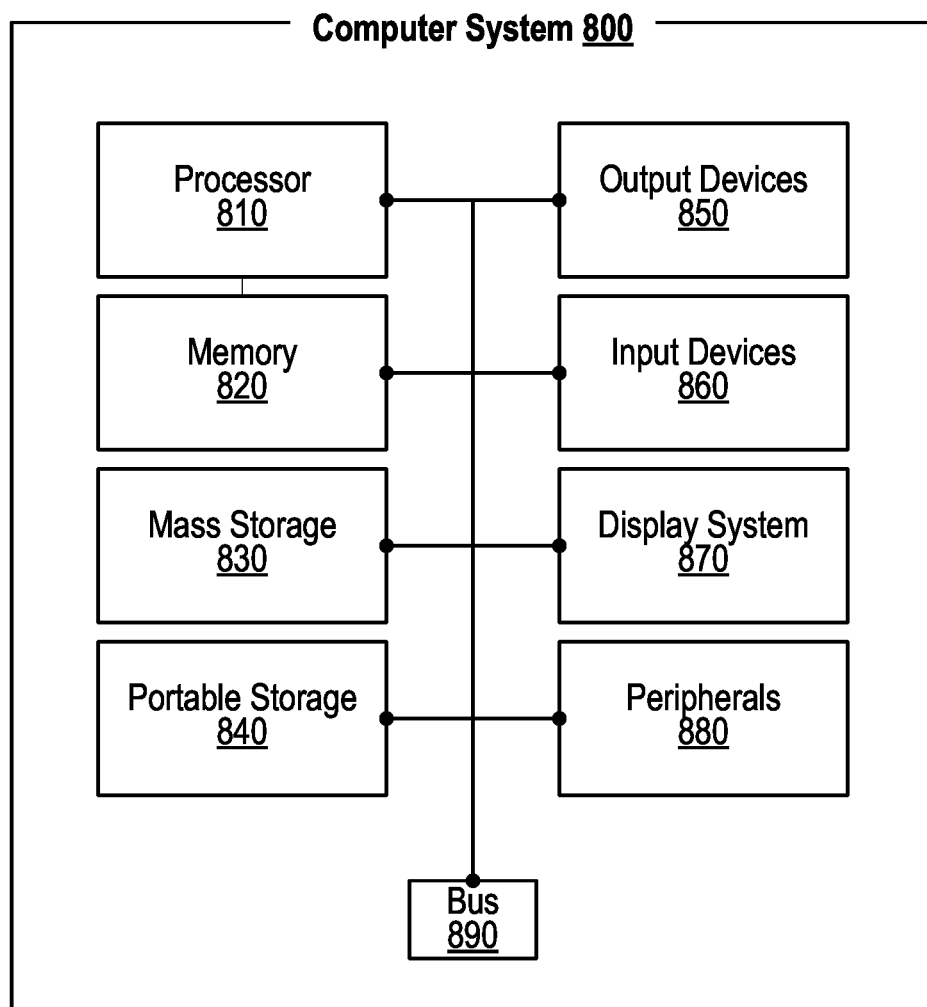
FIG. 8 is a block diagram of an exemplary computing device that may be used to implement some aspects of the subject technology.

FIG. 8 illustrates an exemplary computing system 800 that may be used to implement some aspects of the subject technology. For example, any of the computing devices, computing systems, network devices, network systems, servers, and/or arrangements of circuitry described herein may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, wired or wireless transmitters, wired or wireless transceivers, or any other components necessary for or usable to implement the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, wired or wireless receivers, wired or wireless transceivers, or any other components necessary for or usable to implement the communication types listed above, such as cellular SIM cards.

Input devices 860 may include receivers or transceivers used for positioning of the computing system 800 as well. These may include any of the wired or wireless signal receivers or transceivers. For example, a location of the computing system 800 can be determined based on signal strength of signals as received at the computing system 800 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 800 such as a router, modem, switch, hub, bridge, gateway, or repeater. These may also include Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 860 may include receivers or transceivers corresponding to one or more of these GNSS systems.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include one or more additional output devices of any of the types discussed with respect to output device 850, one or more additional input devices of any of the types discussed with respect to input device 860, one or more additional display systems of any of the types discussed with respect to display system 870, one or more memories or mass storage devices or portable storage devices of any of the types discussed with respect to memory 820 or mass storage 830 or portable storage 840, a modem, a router, an antenna, a wired or wireless transceiver, a printer, a bar code scanner, a quick-response ("QR") code scanner, a magnetic stripe card reader, a integrated circuit chip (ICC) card reader such as a smart-card reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 800 of FIG. 8 can include those typically found in computer systems that may be suitable for use with some aspects of the subject technology and represent a broad category of such computer components that are well known in the art. That said, the computer system 800 of FIG. 8 can be customized and specialized for the purposes discussed herein and to carry out the various operations discussed herein, with specialized hardware components, specialized arrangements of hardware components, and/or specialized software. Thus, the computer system 800 of FIG. 8 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 800 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 800 may also use a Basic Input/Output System (BIOS) or Unified Extensible Firmware Interface (UEFI) as a layer upon which the operating system(s) are run.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

Figure 9:
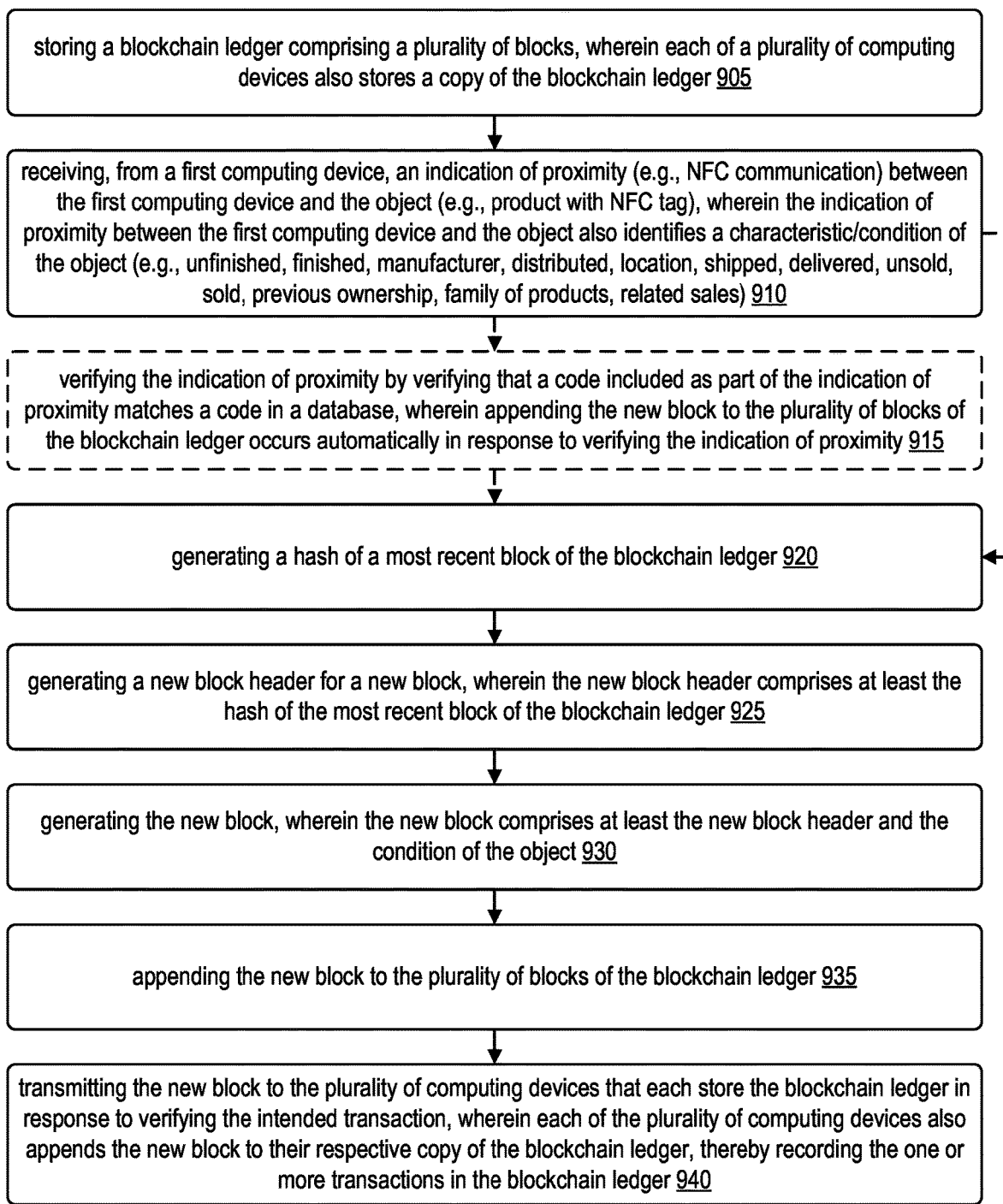
FIG. 9 is a flow diagram illustrating operations for proximity-based tracking of object characteristic via distributed ledger.

FIG. 9 is a flow diagram illustrating operations for proximity-based tracking of object characteristic via distributed ledger. In particular, the operations illustrated in FIG. 9 may be performed by any user device 120 or any computing device 800 in a distributed architecture 125, such as one that performs tasks discussed as being performed by "Miner" Device B in FIG. 7A.

Step 905 includes storing a blockchain ledger comprising a plurality of blocks, wherein each of a plurality of computing devices also stores a copy of the blockchain ledger. This blockchain ledger may alternately be a different type of distributed ledger, such as a DAG ledger as illustrated in FIG. 6.

Step 910 includes receiving, from a first computing device, an indication of proximity (e.g., NFC communications 115) between the first computing device and the object (e.g., product 105 with NFC tag 110), wherein the indication of proximity between the first computing device (e.g., user device 120) and the object also identifies a characteristic or a condition of the object (e.g., unfinished, finished, stage of manufacture, stage of distribution, stage along a supply chain, location, shipping status, delivery status, unsold status, sold status, current or previous ownership, related products, sales of related products, sales of the object itself). Step 910 may also optionally involve receipt of one or more intended transactions as in step 705 of FIG. 7A. The indication of proximity, the intended transactions, or both may be encrypted using a private key associated with the first computing device and/or with a user of the first computing device as in step 710 of FIG. 7A. These may be decrypted with a corresponding public key in step 915 as part of the verification processes, as also discussed with respect to step 720 of FIG. 7A, as well as with respect to FIGS. 1A-1G.

Optional step 915 includes verifying the indication of proximity verifying that a code included as part of the indication of proximity matches a code in a database, wherein appending the new block to the plurality of blocks of the blockchain ledger occurs automatically in response to verifying the indication of proximity. This verification step 915 can alternately or also include any of the verification processes discussed with respect to step 720 of FIG. 7A, any of the verification processes discussed with respect to FIGS. 1A-1G, any other verification processes discussed herein, or combinations thereof.

Step 920 includes generating a hash of a most recent block of the blockchain ledger. Step 925 includes generating a new block header for a new block, wherein the new block header comprises at least the hash of the most recent block of the blockchain ledger. Step 930 includes generating the new block, wherein the new block comprises at least the new block header and the condition of the object. Steps 920, 925, and 930 are discussed further with respect to FIG. 3 and may occur automatically in response to successful completion of the verification processes step 915.

Step 935 includes appending the new block to the plurality of blocks of the blockchain ledger. This may occur automatically in response to generation of the new block in step 930.

Step 940 includes transmitting the new block to the plurality of computing devices that each store the blockchain ledger in response to verifying the intended transaction, wherein each of the plurality of computing devices also appends the new block to their respective copy of the blockchain ledger, thereby recording the one or more transactions in the blockchain ledger. This may occur automatically in response to generation of the new block in step 930 and/or in response to appending the new block at step 940.

Figure 10:
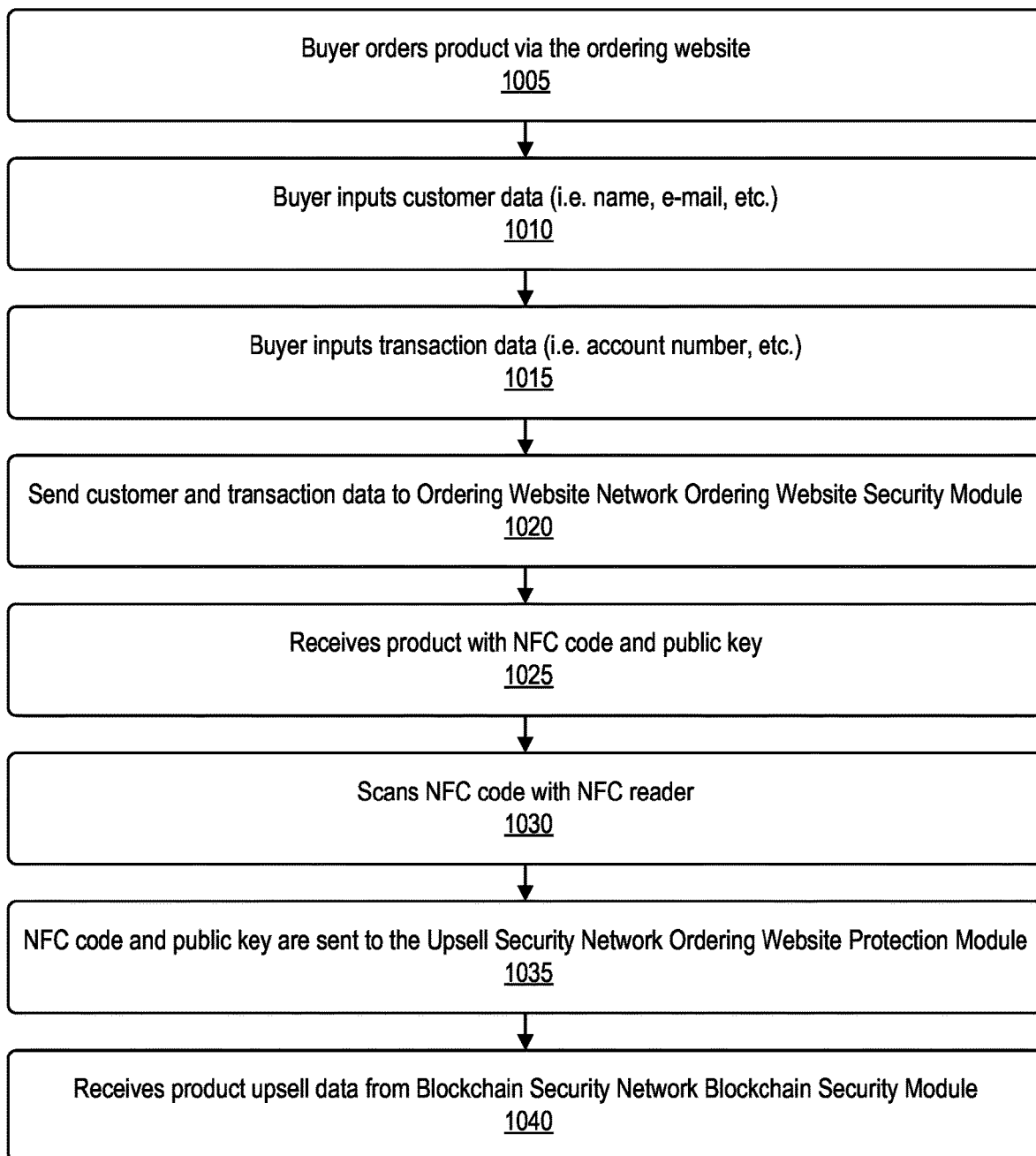
FIG. 10 is a flow diagram illustrating a customer purchasing a product via an online retailer and confirming receipt of the purchased by scanning an NFC tag corresponding to the product.

FIG. 10 is a flow diagram illustrating a customer purchasing a product via an online retailer and confirming receipt of the purchased by scanning an NFC tag corresponding to the product.

The flow diagram of FIG. 10 displays activity by buyers/customers and their respective user devices 120. The process begins with the Buyer ordering a retail product from the ordering website (step 1005). The buyer then inputs their customer data such as their name, e-mail address, shipping address, etc. (step 1010). The buyer inputs their transaction data such as their payment method, account number, billing address, etc. (step 1015). The buyer's customer and transaction data are sent to the Ordering Website Network Ordering Website Security Module (step 1020). The buyer receives the product they purchased which contains an NFC code and public key (located on the NFC code) (step 1025). The buyer scans the NFC code with an NFC reader which may be a user device (step 1030). The NFC code and public key are sent to the Upsell Security Network Ordering Website Protection Module (step 1035), which are then passed on to the Blockchain Security Network Blockchain Security Module to access the upsell product data that is related to the product that the buyer has just received (step 1040). The buyer (on their device) receives the product upsell data from the Blockchain Security Network Blockchain Security Module which contains the upsell products that are related to the product that the buyer just received.

Figure 11:
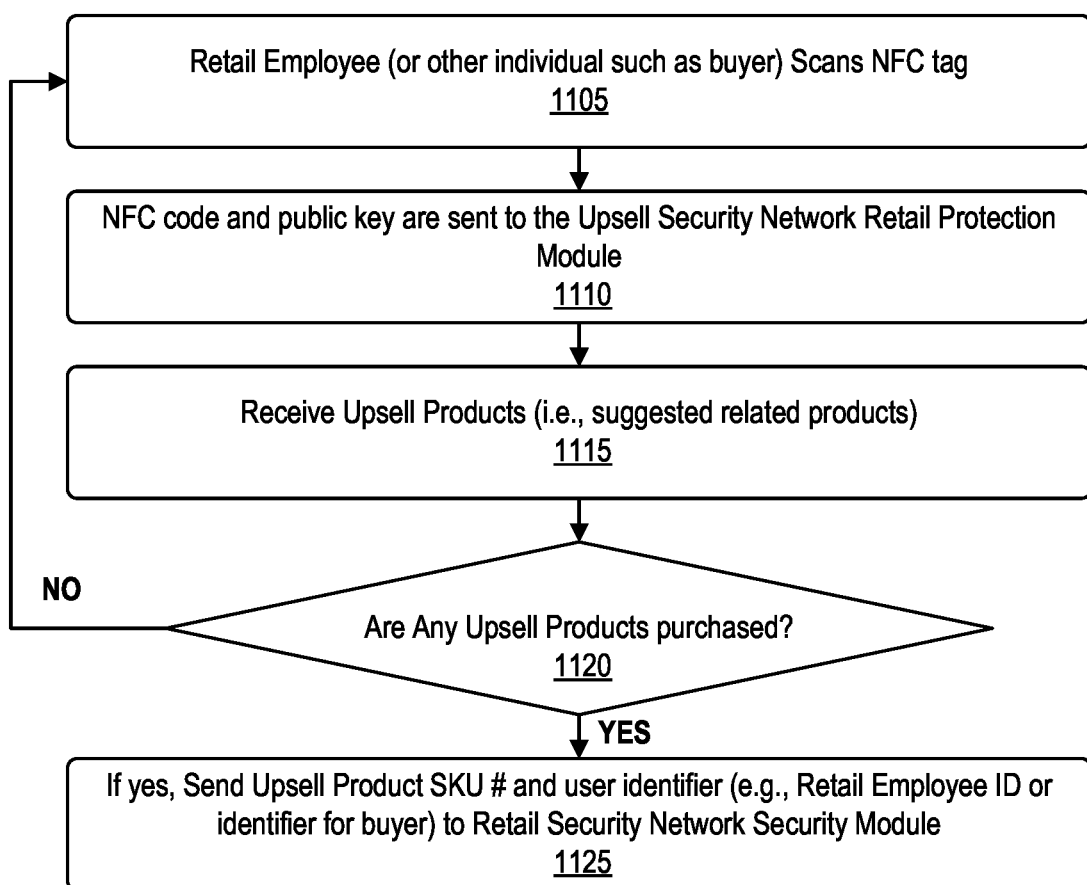
FIG. 11 is a flow diagram illustrating tracking of sales of related products ("upsell" products) by a retail employee.

FIG. 11 is a flow diagram illustrating tracking of sales of related products ("upsell" products) by a retail employee.

The flow diagram of FIG. 11 displays activity by retail employees and their respective user devices 120. The process begins with the retail employee scans the NFC on the product within the retail store that a customer is interested in or is about to purchase (step 1105). The NFC code and public key are sent to the Upsell Security Network Retail Protection Module (step 1110), the public key is stored in the NFC code which is located on the product in the retail store. The retail employee receives the upsell products from the Blockchain Security Network Blockchain Security Module (step 1115). Then it is determined (at step 1120) if any of the upsell products sent to the retail employee are purchased by a client. If no upsell products are purchased the process returns to the retail employee scanning the NFC (at step 1105). If there were upsell products purchased the upsell product SKU number and the retail employee ID are sent to the Retail Security Network Retail Security Module (step 1125) where the data can be stored and used as a metric for how well retail employees increase store sales using the upsell products data.

While FIG. 11 primarily focuses on an implementation in which the retail employee scans the NFC tag 110, it should be understood that other individuals, such as a shopper/buyer in a store, may also scan the NFC tag 110 (or any other equivalent) to receive suggestions of related/upsell products as in FIG. 1E. This may be useful to customers looking for suggestions or products that are similar or complementary to products that they already know that they enjoy.

Figure 12:
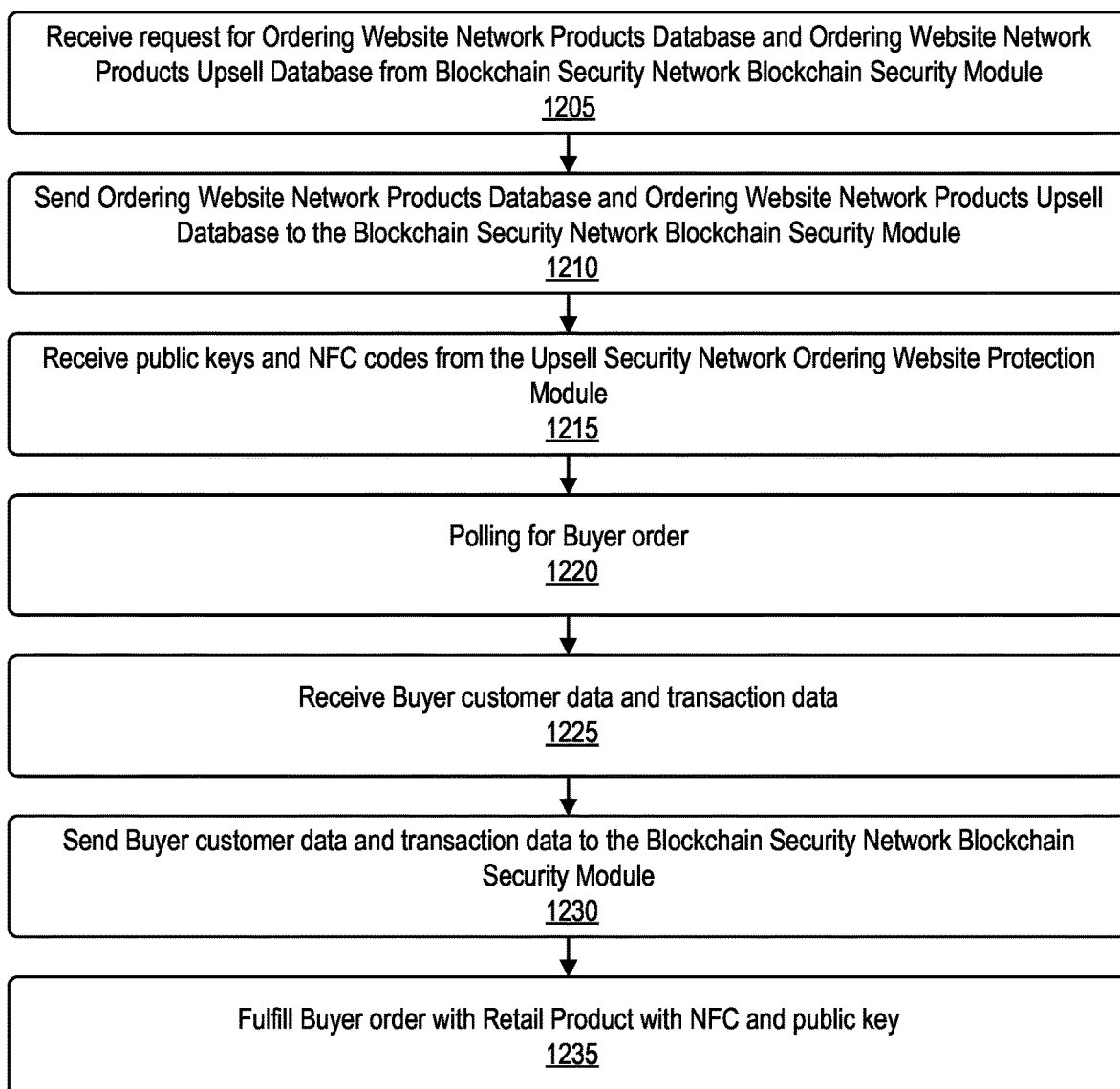
FIG. 12 is a flow diagram illustrating interplay between online retailer databases and distributed ledgers.

FIG. 12 is a flow diagram illustrating interplay between online retailer databases and distributed ledgers.

The flow diagram of FIG. 12 displays operations of the Ordering Website Network Security Module of FIG. 2B. The process begins with receiving a request for the Ordering Website Network Products Database and Ordering Website Network Products Upsell Database from the Blockchain Security Network Blockchain Security Module (step 1205). The Ordering Website Network Products Database and Ordering Website Network Products Upsell Database are both sent to the Blockchain Security Module Blockchain Security Module (step 1210). The Ordering Website Network Security Module receives the public keys and NFC codes from the Upsell Security Network Ordering Website Protection Module (step 1215), which are the public keys and NFC codes for the data that was sent to the Blockchain Security Network Blockchain Security Module to be securely stored. The Ordering Website Network Security Module is then continuously or periodically polling for the Buyer order (step 1220). The Buyer customer data and transaction data is received (step 1225) and is sent to the Blockchain Security Network Blockchain Security Module (step 1230). Lastly, the Buyer order is fulfilled by the Ordering Website Network Security Module and the purchased retail product is sent to the Buyer with the NFC code and public key (step 1235).

FIG. 13 illustrates an online retailer product database tracking related product groups ("upsell" products) as sold by particular retail employees.

The database of FIG. 13 may represent the Retail Security Network Products Sale Database which is provided by the Retail Security Network of FIG. 2B. This database contains the products for sale (by their SKU numbers) and the related upsell products that a customer would potentially purchase based upon the product that they ordered. The database provides the product SKU number, an Upsell 1 SKU number, Upsell 2 SKU number and Upsell N SKU number indicating that there could be an infinite number of products that could related to the purchased product.

The database of FIG. 13 may alternately or additionally represent the Retail Security Network Products Upsell Database which is provided by the Retail Security Network of FIG. 2B. This database contains the upsell products for sale (by their SKU numbers) and the products that a customer purchased. The database provides the upsell product SKU number, a Product 1 SKU number, Product 2 SKU number and Product N SKU number indicating that there could be an infinite number of products related to the upsell product, and the Retail Employee ID as a record of that employee selling an upsell product.

The database of FIG. 13 may alternately or additionally represent the Ordering Website Network Products Sale Database which is provided by the Ordering Website Network of FIG. 2B. This database contains the products for sale (by their SKU numbers) and the related upsell products that a customer would potentially purchase based upon the product that they ordered. The database provides the product SKU number, an Upsell 1 SKU number, an Upsell 2 SKU number and Upsell N SKU number indicating that there could be an infinite number of products that could related to the purchased product.

The Ordering Website Network Products Upsell Database which is provided by the Ordering Website Network of FIG. 2B is similar, but instead contains the upsell products for sale (by their SKU numbers) and the products that a customer purchased. The database provides the upsell product SKU number, an Product 1 SKU number, Product 2 SKU number and Product N SKU number indicating that there could be an infinite number of products related to the upsell product.

Figure 14:
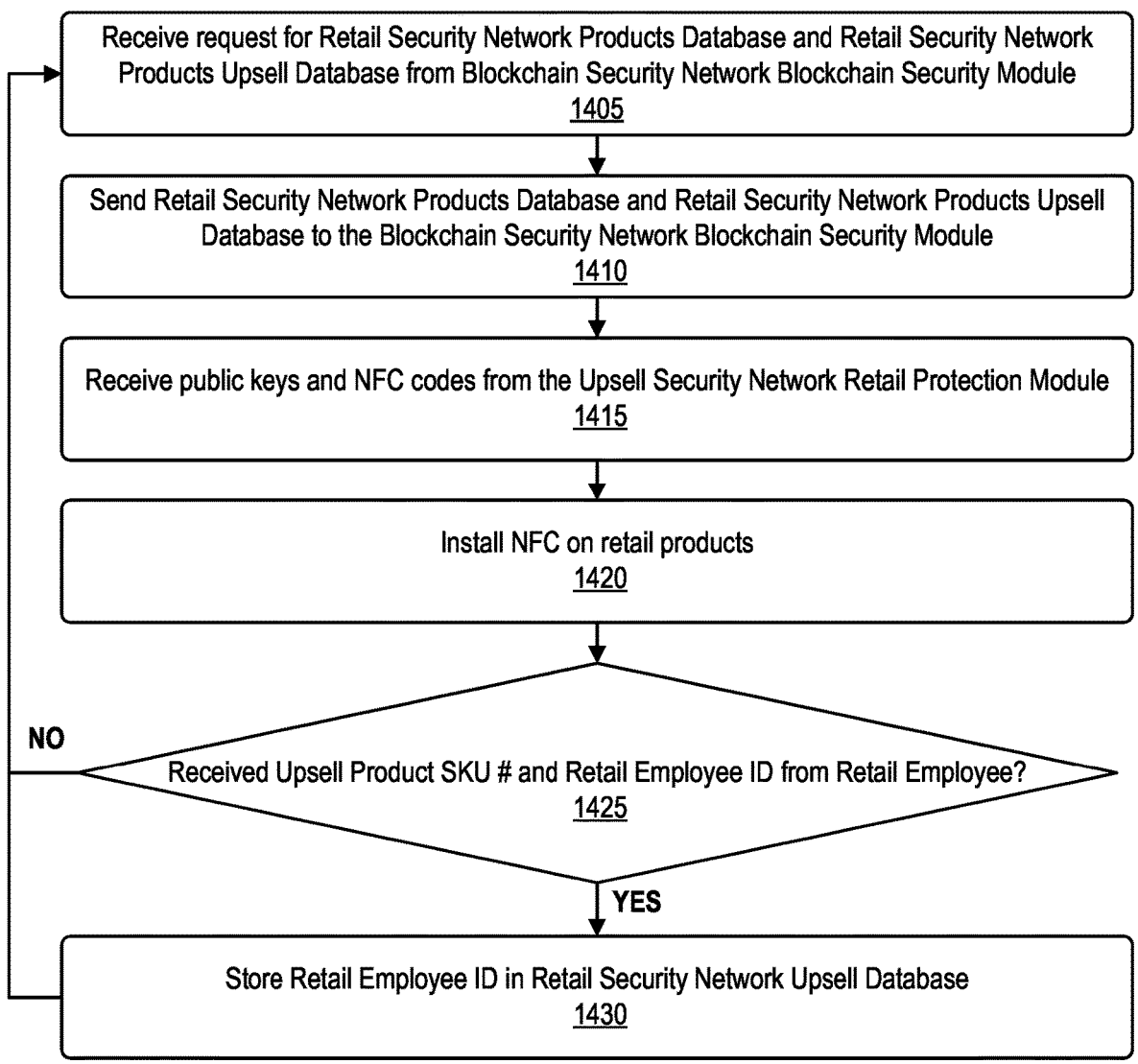
FIG. 14 is a flow diagram illustrating procedures for installation of NFC tags to be used with the present technologies.

FIG. 14 is a flow diagram illustrating procedures for installation of NFC tags to be used with the present technologies.

The flow diagram of FIG. 14 displays operations of the Retail Security Network Security Module of FIG. 2B. The process begins with receiving a request from the Blockchain Security Network Blockchain Security Module for the Retail Security Network Products Database and Retail Security Network Products Upsell Database (step 1405). The Retail Security Network Products Database and Retail Security Network Upsell Database are sent to the Blockchain Security Network Blockchain Security Module (step 1410). The Retail Security Network Security Module then receives public keys and NFC codes from the Upsell Security Network Retail Protection Module (step 1415). The NFC tags 110 are installed on the products that will be on sale in the retail stores (step 1420). It is determined (at step 1425) if the Retail Security Network Security Module receives an Upsell Product SKU number and Retail Employee ID from the Retail Employee. If the Upsell Product SKU number and Retail Employee ID is received, then the Retail Employee ID is stored in the Retail Security Network Upsell Database (step 1430). If no, the process returns to the beginning.

Figure 15:
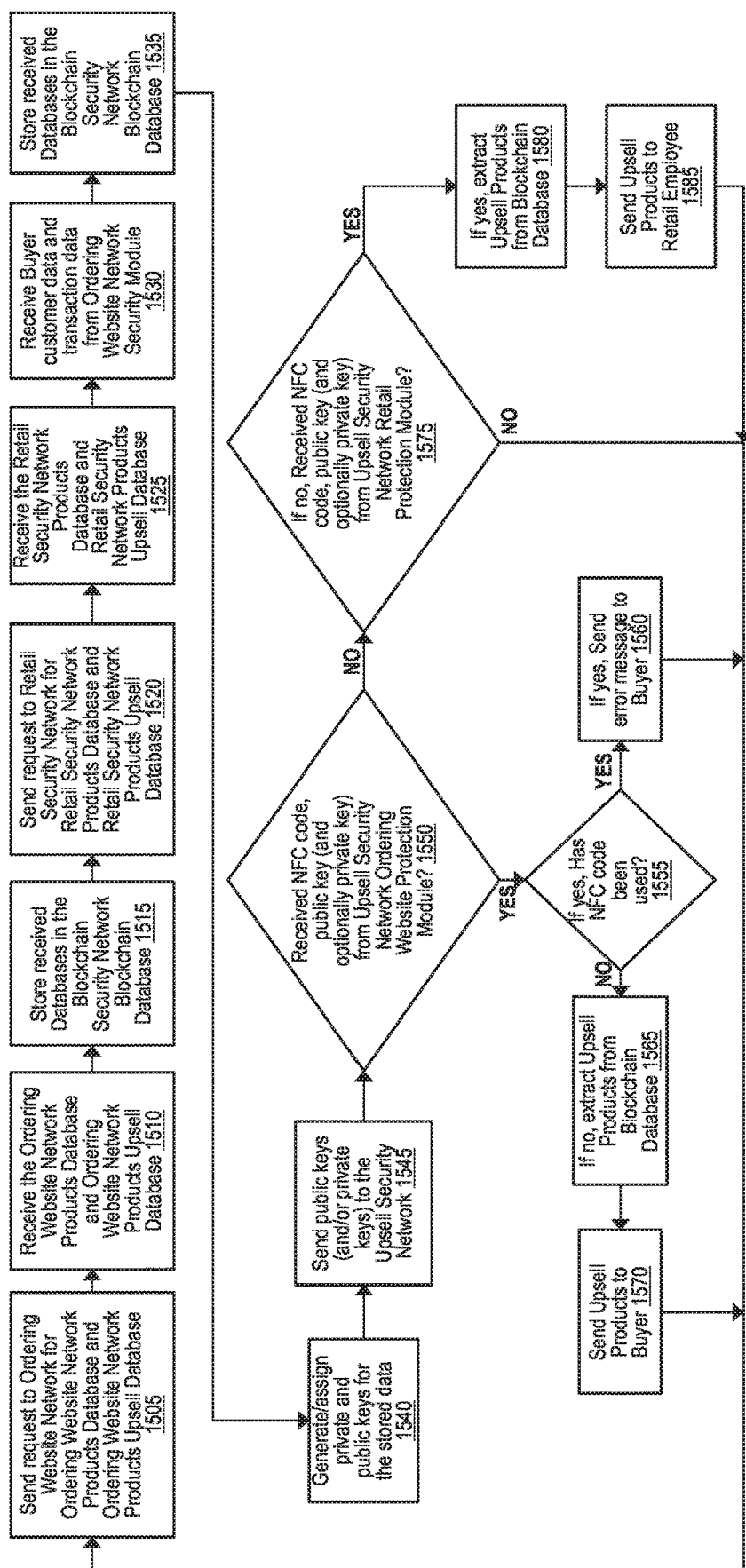
FIG. 15 is a flow diagram illustrating tracking of transactions using NFC tags, databases, and a distributed ledger.

FIG. 15 is a flow diagram illustrating tracking of transactions using NFC tags, databases, and a distributed ledger.

The flow diagram of FIG. 15 displays operations of the Blockchain Security Network Blockchain Security Module of FIG. 2B. The Blockchain Security Module begins with sending a request to the Ordering Website Network for the Ordering Website Network Products Database and Ordering Website Network Products Upsell Database (step 1505) and receives the Ordering Website Network Products Database and Ordering Website Network Products Upsell Database (step 1510). The Ordering Website Network Products Database and Ordering Website Network Products Upsell Database are stored in the Blockchain Security Network Blockchain Database (step 1515). Then the Blockchain Security Module sends a request to the Retail Security Network for the Retail Security Network Products Database and Retail Security Network Products Upsell Database (step 1520), and receives the Retail Security Network Products Database and Retail Security Network Products Upsell Database (step 1525). The Blockchain Security Module also receives the Buyer customer data and transaction data from the Ordering Website Network Security Module (step 1530). The Retail Security Network Products Database, Retail Security Network Products Upsell Database, customer data, and transaction data are stored in the Blockchain Security Network Blockchain Database (step 1535). Private and public keys are generated and/or assigned to each data entry to securely store the data (step 1540). The public keys and optionally the private keys are sent to the Upsell Security Network (step 1545). It is determined (at step 1550) if the Blockchain Security Module receives the NFC code, public and/or private key from the Upsell Security Network Ordering Website Protection Module. If yes, it is determined (at step 1555) if the NFC code has been used. If the NFC code has not been used, the upsell products are extracted from the Blockchain Database (step 1565), and is sent to the Buyer (step 1570). If the NFC code has been used, an error message is sent to the Buyer (step 1560). If data has not been received from the Upsell Security Network Ordering Website Protection Module, it is then determined (at step 1575) if the Blockchain Security Module receives the NFC code, public and private key from the Upsell Security Network Retail Protection Module. If not, the process returns to the beginning (step 1505). If yes, the upsell products are extracted from the Blockchain Database (step 1580), and are sent to the Retail Employee (step 1585).

FIG. 16 illustrates a transaction tracking database optionally for use with or instead of the distributed ledger.

The database of FIG. 16 may represent the Blockchain Database which is provided by the Blockchain Security Network of FIG. 2B. It which securely stores all the data from the Retail Security Network, Ordering Website Network, Buyer and Upsell Security Network. The database contains the private and public keys, customer data such as the Buyer's name, address, and e-mail, NFC Data such as the code, ordering website, and retailer, product data such as the SKU number, upsell product SKU numbers, and transaction data such as account numbers, price, and if NFC use.

The database of FIG. 16 may alternately or additionally represent the Upsell Security Database of FIG. 2B, which receives the private and public keys from the Blockchain Security Network Blockchain Security Module and assigns an NFC code to the data entries to provide Buyers and Retail Employees an NFC code that can be used to receive public key to access the secure data (the upsell products) in the Blockchain Security Network Blockchain Database. The database contains both the private and public keys, the NFC Data such as the code, ordering website and retailer.

FIG. 17 is a flow diagram illustrating data transfer with respect to keys and NFC data in a purchase made through an online retailer.

The flow diagram of FIG. 17 displays operations of the Upsell Security Network Ordering Website Protection Module of FIG. 2B. The process begins with receiving the public keys and optionally private keys from Blockchain Security Network Blockchain Security Module (step 1705). The private and public keys are stored in the Upsell Security Network Upsell Database (step 1710), and an NFC code is assigned to a public key (step 1715). The NFC code is sent to the Blockchain Security Network Blockchain Security Module (step 1720). The public keys and NFC code are sent to the Ordering Website Network Security Module (step 1725) to be used on the products that are shipped to the Buyer. The Upsell Security Network Ordering Website Protection Module is then continuously polling for NFC code and public key from the Buyer (step 1730). The NFC code and public key are received from the Buyer (step 1735). The NFC code, Buyer public key and optionally the Upsell Security Network Upsell Database private key are sent to the Blockchain Security Network Blockchain Security Module (step 1740).

FIG. 18 is a flow diagram illustrating data transfer with respect to keys and NFC data in a purchase made through a brick-and-mortar retailer.

The flow diagram of FIG. 18 displays operations of the Upsell Security Network Retail Protection Module of FIG. 2B. The process begins with receiving the private and public keys from Blockchain Security Network Blockchain Security Module (step 1805). The private and public keys are stored in the Upsell Security Network Upsell Database (step 1810), and an NFC code is assigned to a public key (step 1815). The NFC code is sent to the Blockchain Security Network Blockchain Security Module (step 1820). The public keys and NFC code are sent to the Retail Security Network Security Module to be used on the products that are in the retail stores (step 1825). The NFC code and public key are received from the Retail Employee (step 1830). The NFC code, Buyer public key and optionally the Upsell Security Network Upsell Database private key are sent to the Blockchain Security Network Blockchain Security Module (step 1835).

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 800 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of ledger-based asset tracking, the method comprising:
   storing a distributed ledger associated with an asset, the distributed ledger including a plurality of blocks;
   receiving an indication of an interaction between a computing device associated with a user and an interactive element associated with the asset, wherein the indication of the interaction identifies the asset;
   generating a new block automatically in response to receiving the indication of the interaction, wherein the new block includes a payload identifying a relationship between the asset and at least the user associated with the interaction, wherein the new block also includes a new block header that includes a hash of at least a portion of a most recent block of the distributed ledger; and
   causing the new block to be appended to the plurality of blocks of the distributed ledger.

2. The method of claim 1, wherein the asset is a virtual asset.

3. The method of claim 1, wherein the asset includes an amount of a cryptocurrency.

4. The method of claim 1, wherein the asset is associated with an object, and wherein the interactive element is coupled to the object.

5. The method of claim 1, wherein the interactive element includes short-range wireless communication circuitry, and wherein the interaction between the computing device and the interactive element includes a communication of at least one short-range wireless signal between the computing device and the short-range wireless communication circuitry.

6. The method of claim 1, wherein the interactive element includes an optical glyph that optically encodes information, and wherein the interaction between the computing device and the interactive element includes an optical scanning of the optical glyph by the computing device and a decoding of the information that is optically encoded in the optical glyph by the computing device.

7. The method of claim 1, wherein the asset is associated with at least one image.

8. The method of claim 1, wherein the payload of the new block identifies a transfer of ownership of the asset between the user and a second user to identify the relationship between the asset and at least the user.

9. The method of claim 1, wherein the payload of the new block identifies access to the asset by the user to identify the relationship between the asset and at least the user.

10. The method of claim 1, wherein the payload of the new block identifies modification of the asset by the user to identify the relationship between the asset and at least the user.

11. The method of claim 1, wherein the payload of the new block indicates a change in storage of information associated with the asset to identify the relationship between the asset and at least the user, wherein the change in storage of the information is from a first storage location to a second storage location.

12. The method of claim 1, wherein the payload of the new block identifies a borrowing of the asset between the user and a second user to identify the relationship between the asset and at least the user.

13. The method of claim 1, wherein a card includes the interactive element, and wherein the interaction between the computing device and the interactive element includes receipt, by the computing device, of information read from the card using a card reader.

14. The method of claim 1, further comprising:
    verifying an authenticity of the relationship between the asset and at least the user based on the new block in the distributed ledger.

15. A system for ledger-based asset tracking, the system comprising:
    at least one memory storing instructions; and
    at least one processor coupled to the at least one memory, wherein execution of the instructions by the at least one processor causes the at least one processor to:
       store a distributed ledger associated with an asset, the distributed ledger including a plurality of blocks;
       receive an indication of an interaction between a computing device associated with a user and an interactive element associated with the asset, wherein the indication of the interaction identifies the asset;
       generate a new block automatically in response to receiving the indication of the interaction, wherein the new block includes a payload identifying a relationship between the asset and at least the user associated with the interaction, wherein the new block also includes a new block header that includes a hash of at least a portion of a most recent block of the distributed ledger; and cause the new block to be appended to the plurality of blocks of the distributed ledger.

16. The system of claim 15, wherein the asset is a virtual asset.

17. The system of claim 15, wherein the interactive element includes a short-range wireless communication circuitry, and wherein the interaction between the computing device and the interactive element includes a communication of at least one short-range wireless signal between the computing device and the short-range wireless communication circuitry.

18. The system of claim 15, wherein the interactive element includes an optical glyph that optically encodes information, wherein the interaction between the computing device and the interactive element includes an optical scanning of the optical glyph by the computing device and a decoding of the information that is optically encoded in the optical glyph by the computing device.

19. The system of claim 15, wherein the payload of the new block indicates a change in storage of information associated with the asset to identify the relationship between the asset and at least the user, wherein the change in storage of the information is from a first storage location to a second storage location.

20. The system of claim 15, wherein the payload of the new block identifies a transfer of ownership of the asset between the user and a second user to identify the relationship between the asset and at least the user.

21. The system of claim 15, wherein a card includes the interactive element, and wherein the interaction between the computing device and the interactive element includes receipt, by the computing device, of information read from the card using a card reader.

* * * * *